(12) United States Patent
Cherkas et al.

(10) Patent No.: US 11,295,444 B2
(45) Date of Patent: Apr. 5, 2022

(54) VISION AND GEOMETRIC APPROACHES TO DETECT DEFECTS IN DENTAL APPLIANCES

(71) Applicant: Align Technology, Inc., San Jose, CA (US)

(72) Inventors: Andrey Cherkas, Krasnoznamensk (RU); Danila Chesnokov, Barnaul (RU); Anatoliy Parpara, Moscow (RU)

(73) Assignee: Align Technology, Inc., San Jose, CA (US)

( * ) Notice: Subject to any disclaimer, the term of this patent is extended or adjusted under 35 U.S.C. 154(b) by 148 days.

(21) Appl. No.: 16/837,954

(22) Filed: Apr. 1, 2020

(65) Prior Publication Data
US 2020/0311934 A1 Oct. 1, 2020

Related U.S. Application Data

(60) Provisional application No. 62/827,671, filed on Apr. 1, 2019.

(51) Int. Cl.
| | |
|---|---|
| *G06K 9/00* | (2006.01) |
| *G06T 7/00* | (2017.01) |
| *A61C 7/08* | (2006.01) |
| *A61C 7/00* | (2006.01) |
| *G06T 7/11* | (2017.01) |

(Continued)

(52) U.S. Cl.
CPC ............ *G06T 7/0012* (2013.01); *A61C 7/002* (2013.01); *A61C 7/08* (2013.01); *G06T 5/002* (2013.01); *G06T 7/11* (2017.01); *G06T 7/136* (2017.01); *G06T 7/32* (2017.01); *G06T 7/38* (2017.01); *G06T 17/205* (2013.01); *B33Y 80/00* (2014.12); *G06T 2207/20081* (2013.01); *G06T 2207/20084* (2013.01); *G06T 2207/20182* (2013.01); *G06T 2207/30036* (2013.01)

(58) Field of Classification Search
CPC .................................................. G06T 7/0012
See application file for complete search history.

(56) References Cited

U.S. PATENT DOCUMENTS

| | | | |
|---|---|---|---|
| 5,305,391 | A | 4/1994 | Gomibuchi |
| 5,975,893 | A | 11/1999 | Chishti et al. |

(Continued)

FOREIGN PATENT DOCUMENTS

CN 102081050 A 6/2011

*Primary Examiner* — Oneal R Mistry
(74) *Attorney, Agent, or Firm* — Lowenstein Sandler LLP

(57) ABSTRACT

Multiple techniques for detecting defects in customized dental appliances are disclosed. In one technique, processing logic obtains one or more images of a customized dental appliance, obtains a digital model associated with the customized dental appliance, and performs segmentation on the one or more images to identify an area of the one or more images that comprises a representation of the customized dental appliance. Processing logic then registers the one or more images to the digital model, compares the area of the one or more images of the customized dental appliance with the digital model of the customized dental appliance, determines a difference between the area of the one or more images that comprises the representation of the customized dental appliance and the digital model of the customized dental appliance at a region, and determines whether the difference satisfies a defect criterion.

30 Claims, 16 Drawing Sheets

(51) Int. Cl.
    *G06T 7/38*     (2017.01)
    *G06T 7/32*     (2017.01)
    *G06T 17/20*     (2006.01)
    *G06T 5/00*     (2006.01)
    *G06T 7/136*     (2017.01)
    *B33Y 80/00*     (2015.01)

(56) References Cited

U.S. PATENT DOCUMENTS

| | | |
|---|---|---|
| 6,210,162 B1 | 4/2001 | Chishti et al. |
| 6,309,215 B1 | 10/2001 | Phan et al. |
| 6,450,807 B1 | 9/2002 | Chishti et al. |
| 6,749,414 B1 | 6/2004 | Hanson et al. |
| 6,830,450 B2 | 12/2004 | Knopp et al. |
| 7,892,474 B2 | 2/2011 | Shkolnik et al. |
| 10,782,629 B2 | 9/2020 | Hwang et al. |
| 2004/0120570 A1 | 6/2004 | Levi et al. |
| 2006/0131770 A1 | 6/2006 | Dierkes et al. |
| 2007/0238064 A1 | 10/2007 | Stark et al. |
| 2008/0050692 A1 | 2/2008 | Hilliard |
| 2010/0322506 A1 | 12/2010 | Muramatsu et al. |
| 2013/0095446 A1 | 4/2013 | Andreiko et al. |
| 2013/0282351 A1* | 10/2013 | Tank ............... G16H 20/40 703/11 |
| 2014/0061974 A1 | 3/2014 | Tyler |
| 2014/0265034 A1 | 9/2014 | Dudley |
| 2015/0060667 A1 | 3/2015 | Yamaguchi et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0254828 A1 | 9/2015 | Beach et al. |
| 2016/0110859 A1 | 4/2016 | Luoh et al. |
| 2016/0128803 A1 | 5/2016 | Webber et al. |
| 2016/0300338 A1 | 10/2016 | Zafar et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0262974 A1 | 9/2017 | Kasahara |
| 2018/0002039 A1 | 1/2018 | Finn et al. |
| 2018/0028063 A1* | 2/2018 | Elbaz ............... G06T 17/00 |
| 2018/0028281 A1 | 2/2018 | Li et al. |
| 2018/0116762 A1 | 5/2018 | Kopelman |
| 2018/0303583 A1 | 10/2018 | Tong et al. |
| 2019/0102880 A1 | 4/2019 | Parpara et al. |
| 2019/0105127 A1 | 4/2019 | Velazquez et al. |
| 2019/0295254 A1 | 9/2019 | Parpara et al. |
| 2019/0318479 A1* | 10/2019 | Ajri ............... A61C 9/0093 |
| 2019/0338067 A1 | 11/2019 | Liska et al. |
| 2019/0345276 A1 | 11/2019 | Liska et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0242765 A1 | 7/2020 | Parpara et al. |
| 2020/0357116 A1 | 11/2020 | Parpara et al. |

\* cited by examiner

VISION AND GEOMETRIC APPROACHES TO DETECT DEFECTS IN DENTAL APPLIANCES

RELATED APPLICATIONS

This patent application claims the benefit under 35 U.S.C. § 119(e) of U.S. Provisional Application No. 62/827,671, filed Apr. 1, 2019, which is herein incorporated by reference. Related U.S. patent application Ser. No. 15/726,211, filed Oct. 5, 2017, is herein incorporated by reference. Related U.S. patent application Ser. No. 16/145,016, filed Sep. 27, 2018, is herein incorporated by reference. Related U.S. Provisional Patent application No. 62/737,458, filed Sep. 27, 2018, and its counterpart non-provisional U.S. patent application Ser. Nos. 16/584,786, 16/584,788, 16/584,791 and 16/584,794 all filed on Sep. 26, 2019, are herein incorporated by reference.

TECHNICAL FIELD

Embodiments of the present disclosure relate to the field of manufacturing custom products and, in particular, to image based and geometric based defect detection systems.

BACKGROUND

For some applications, dental appliances are formed around molds to achieve a negative of the mold. The dental appliances are then removed from the molds to be further used for various applications. One example application in which a dental appliance is formed around a mold and then later used is corrective dentistry or orthodontic treatment. In such an application, the mold may be a positive mold of a dental arch for a patient and the dental appliance may be an orthodontic aligner to be used for aligning one or more teeth of the patient. When attachments are used, the mold may also include features associated with planned orthodontic attachments and virtual fillers.

Molds may be formed using casting or rapid prototyping equipment. For example, 3D printers may manufacture the molds using additive manufacturing techniques (e.g., stereolithography) or subtractive manufacturing techniques (e.g., milling). The aligners may then be formed over the molds using thermoforming equipment. Once the aligner is formed, it may be manually or automatically trimmed. In some instances, a computer controlled 4-axis or 5-axis trimming machine (e.g., a laser trimming machine or a mill) is used to trim the aligner along a cutline. The trimming machine uses electronic data that identifies the cutline to trim the aligner. Thereafter, the aligner may be removed from the mold and delivered to the patient.

Quality control for aligners is generally performed manually by quality control personnel visually inspecting aligners. However, there is a large variation between performance of quality control personnel. For example, some personnel may reject an aligner as having a defect and different personnel may pass that same aligner. Additionally, visual inspection can result in high rates of false positives (in which aligners are marked as defective when they have no defects) as well as false negatives (in which aligners pass quality control but later fail due to defects).

SUMMARY

A first aspect of the disclosure is related to a method for detecting one or more defects in a customized dental appliance, where the customized dental appliance is customized for a specific arch of a specific patient. The method includes obtaining one or more images of the customized dental appliance, obtaining a digital model associated with the customized dental appliance, and performing segmentation on the one or more images to identify an area of the one or more images that comprises a representation of the customized dental appliance. The method further includes registering the one or more images to the digital model, comparing the area of the one or more images of the customized dental appliance with the digital model of the customized dental appliance, and determining a difference between the area of the one or more images that comprises the representation of the customized dental appliance and the digital model of the customized dental appliance at a region. The method further includes determining whether the difference satisfies a defect criterion, and responsive to determining that the difference satisfies the defect criterion, determining that the customized dental appliance has a manufacturing defect at the region associated with the difference.

A second aspect of the disclosure is related to a method for predicting one or more manufacturing defects in a customized dental appliance, wherein the customized dental appliance customized for a specific arch of a specific patient. The method includes transforming a plurality of points in a digital model of a mold for the customized dental appliance into a voxel volume comprising a plurality of voxels, and performing a first smoothing operation on the voxel volume to generate a first smoothed surface comprising first curves having at least a first minimum radius. The method further includes performing a second smoothing operation on the voxel volume to generate a second smoothed surface comprising second curves having at least a second minimum radius, and determining distances between points on the first smoothed surface and corresponding points on the second smoothed surface. The method further includes determining whether any of the distances exceed a threshold, and responsive to determining that at least one of the distances exceeds the threshold, determining that a point associated with the distance represents a region with a high probability of having a manufacturing defect.

A third aspect of the disclosure is a system comprising a memory and a processing device operably coupled to the memory. The memory comprises instructions for detecting one or more defects in a customized dental appliance, wherein the customized dental appliance customized for a specific arch of a specific patient. The processing device may execute the instructions stored in the memory. Execution of the instructions causes the processing device to obtain one or more images of the customized dental appliance, obtain a digital model associated with the customized dental appliance, perform segmentation on the one or more images to identify an area of the one or more images that comprises a representation of the customized dental appliance, register the one or more images to the digital model, compare the area of the one or more images of the customized dental appliance with the digital model of the customized dental appliance, determine a difference between the area of the one or more images that comprises the representation of the customized dental appliance and the digital model of the customized dental appliance at a region, determine whether the difference satisfies a defect criterion, and responsive to determining that the difference satisfies the defect criterion, determine that the customized dental appliance has a manufacturing defect at the region associated with the difference.

A fourth aspect of the disclosure is a system comprising a memory and a processing device operably coupled to the memory. The memory comprises instructions for detecting one or more defects in a customized dental appliance, wherein the customized dental appliance customized for a specific arch of a specific patient. The processing device may execute the instructions stored in the memory. Execution of the instructions causes the processing device to transform a plurality of points in a digital model of a mold for the customized dental appliance into a voxel volume comprising a plurality of voxels, perform a first smoothing operation on the voxel volume to generate a first smoothed surface comprising first curves having at least a first minimum radius, perform a second smoothing operation on the voxel volume to generate a second smoothed surface comprising second curves having at least a second minimum radius, determine distances between points on the first smoothed surface and corresponding points on the second smoothed surface, determine whether any of the distances exceed a threshold, and responsive to determining that at least one of the distances exceeds the threshold, determine that a point associated with the distance represents a region with a high probability of having a manufacturing defect.

BRIEF DESCRIPTION OF THE DRAWINGS

The present disclosure is illustrated by way of example, and not by way of limitation, in the figures of the accompanying drawings.

DETAILED DESCRIPTION

Figure 1:
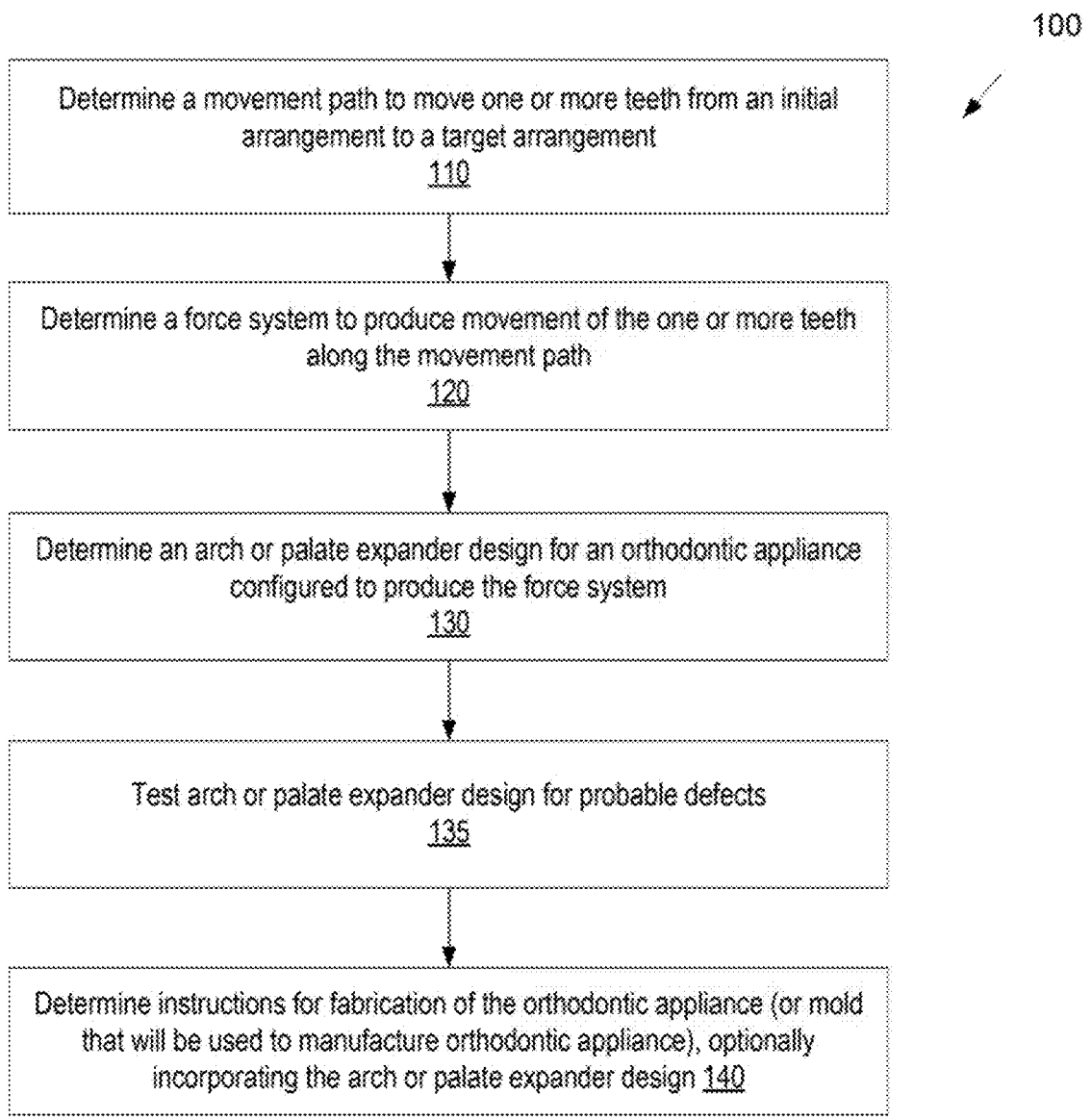
FIG. 1 illustrates a method for designing an orthodontic appliance, in accordance with embodiments.

Described herein are embodiments covering systems, methods, and/or computer-readable media for detection of defects in customized dental appliances (e.g., customized orthodontic aligners and/or palatal expanders). Defect detection of custom dental appliances is particularly difficult, especially in orthodontic aligner manufacturing where orthodontic aligners are individually customized for every single patient. Additionally, each aligner in a series of aligners used to treat a single patient is unique compared to other aligners in the same series because each aligner is specific to different stages of treatment. Further compounding the issue is that each patient receives a pair of aligners for each stage of treatment, one unique aligner for treating the upper arch and one unique aligner for treating the lower arch. In some instances, a single treatment can include 50-60 stages for treating a complex case, meaning 100-120 uniquely manufactured aligners for a single patient. When manufacturing aligners for patients worldwide, several hundred thousand completely unique and customized aligners may be manufactured per day. As such, quality control of the custom manufactured products can be a particularly daunting task. Quality control of manufactured aligners may be performed to ensure that the aligners are defect free or that defects are within tolerable thresholds. Similar quality control issues exist for manufacturing of other custom dental appliances as well, such as sleep apnea appliances, palatal expanders, and so on. The quality control process may be aimed at detecting one or more of the following types of defect: arch variation, bend, cutline variation, debris, webbing, cracking, trimmed attachment, missing attachment, and so forth. Typically, a technician manually performs a quality control process to inspect aligners (or other dental appliances). However, this manual quality control process may be very time consuming and prone to error due to the inherent subjectivity of the technician. As such, embodiments of the present disclosure may provide a more scalable, automated, and/or objective process for detecting of defects in dental appliances such as orthodontic aligners.

As mentioned, defects in dental appliances may include one or more of arch variation, deformation, bend (compressed or expanded) of the dental appliances, cutline variations, debris, webbing, trimmed attachments, missing attachments, burrs, flaring, power ridge issues, material breakage, short hooks, bubbles, cracks, and so forth. In some embodiments, the identification of defects in a dental appliance may be based on an image (or multiple images) of the dental appliance compared with a digitally generated model of the dental appliance or of a mold used to manufacture the dental appliance.

In one embodiment a method for detecting one or more defects in a customized dental appliance includes obtaining one or more images of the customized dental appliance, obtaining a digital model associated with the customized dental appliance, performing segmentation on the one or more images to identify an area of the one or more images that comprises a representation of the customized dental appliance, registering the one or more images to the digital model, and comparing the area of the one or more images of the customized dental appliance with the digital model of the customized dental appliance. The method further includes determining a difference between the area of the one or more images that comprises the representation of the customized dental appliance and the digital model of the customized dental appliance at a region and determining whether the difference satisfies a defect criterion. Responsive to determining that the difference satisfies the defect criterion, a determination is made that the customized dental appliance has a manufacturing defect at the region associated with the difference. Large discrepancies in curvature between the digital model and the image may be indicative of breakage. Additionally, lines that are present in the image but not present in the digital model may be indicative of cracks or fractures in the dental appliance.

In some embodiments, regions of a dental appliance that have a high probability of having a defect are predicted. The identification of probable defects in a dental appliance may be based on analysis of a digital model of a mold (e.g., of a dental arch) used to generate the dental appliance. In one embodiment, a method for predicting one or more manufacturing defects in a customized dental appliance includes transforming a plurality of points in a digital model of a mold for the customized dental appliance into a voxel volume comprising a plurality of voxels. The method further includes performing a first smoothing operation on the voxel volume to generate a first smoothed surface comprising first curves having at least a first minimum radius and performing a second smoothing operation on the voxel volume to generate a second smoothed surface comprising second curves having at least a second minimum radius. The method further includes determining distances between points on the first smoothed surface and corresponding points on the second smoothed surface and determining whether any of the distances exceed a threshold. Responsive to determining that at least one of the distances exceeds the threshold, a determination is made that a point associated with the distance represents a region with a high probability of having a manufacturing defect. This method may be performed during treatment planning of an orthodontic treatment to determine any regions of any orthodontic aligner associated with a treatment plan that have an increased probability having a defect. The method may be particularly suited to predicting stress concentration points that may result in cracks in a dental appliance.

Embodiments provide an automated technique to a) predict where defects are likely to occur in dental appliances before those dental appliances are manufactured and b) identify where defects have actually occurred in a manufactured dental appliance. This may greatly speed up the quality control process, while minimizing false positives (in which dental appliances are incorrectly determined to have defects) and false negatives (in which dental appliances are incorrectly determined not to have defects).

Various software and/or hardware components may be used to implement the disclosed embodiments. For example, software components may include computer instructions stored in a tangible, non-transitory computer-readable media that are executed by one or more processing devices to perform image based defect detection and/or digital model based defect prediction.

Some embodiments are discussed herein with reference to orthodontic aligners (also referred to simply as aligners). However, embodiments also extend to other types of dental appliances formed over molds, such as orthodontic retainers, orthodontic splints, sleep appliances for mouth insertion (e.g., for minimizing snoring, sleep apnea, etc.) and/or dental appliances for other applications. Other dental appliances include removable mandibular repositioning devices and removable surgical fixation devices, for example. Accordingly, it should be understood that embodiments herein that refer to aligners (e.g., orthodontic aligners) also apply to other types of dental appliances.

Turning now to the figures, FIG. 1 illustrates a method 100 for designing an orthodontic appliance. Some or all of the blocks of the method 100 can be performed by any suitable data processing system or device, e.g., one or more processors configured with suitable instructions. In block 110, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, intraoral scanning, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth and/or dental arches can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth and/or a dental arch, the final position and surface geometry of each tooth can be specified to form a complete model of the tooth arrangement at the desired end of treatment (e.g., of the dental arch post treatment).

Having both an initial position and a target position for each tooth, a movement path can be defined for the motion of each tooth. In some embodiments, the movement paths are configured to move the teeth in the quickest fashion with the least amount of aligners to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 120, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 130, an orthodontic appliance configured to produce the force system is determined. This can include determination of an arch design and/or a palate expander design for the orthodontic appliance. The arch or palate expander design may include different dental arch and/or tooth configurations for each stage of treatment. A separate digital model of an upper and/or lower dental arch of a patient may be generated for each stage of treatment. Each arch design may be represented by a virtual 3D model (also referred to herein as a digital model) of the dental arch.

At block 135, the arch or palate expander design may be tested for probable defects. This may include testing the digital models of the upper and/or lower dental arches for each of the stages of treatment. Each digital model may be tested as is described in greater detail below to determine whether there are any regions of the orthodontic appliance associated with the digital model that have a high probability of developing a defect.

If any digital models of dental arches have predicted defects (regions with increased probability of producing a dental appliances that will develop a defect), then remedial action may be performed to reduce the chance of the defect. This may include adding a virtual filler material to the digital model of a dental arch, as described in U.S. patent application Ser. No. 15/726,211, filed Oct. 5, 2017, which is herein incorporated by reference. Alternatively, a dental practitioner may manually add filler material to the identified regions in the digital model and/or a technician may manually add material to a physical mold generated from the digital model. Alternatively, or additionally, a treatment plan may be modified to mitigate or eliminate points of weakness, such as by changing attachments, changing the order of tooth repositioning and/or rotating steps, and so on.

In block 140, instructions for fabrication of the orthodontic appliance or a mold that will be used to manufacture the orthodontic appliance are generated. The instructions can be configured to control a fabrication system or device in order to produce the orthodontic appliance and/or the mold. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by direct 3D printing of the mold, and then thermoforming a plastic sheet over the mold.

Figure 2:
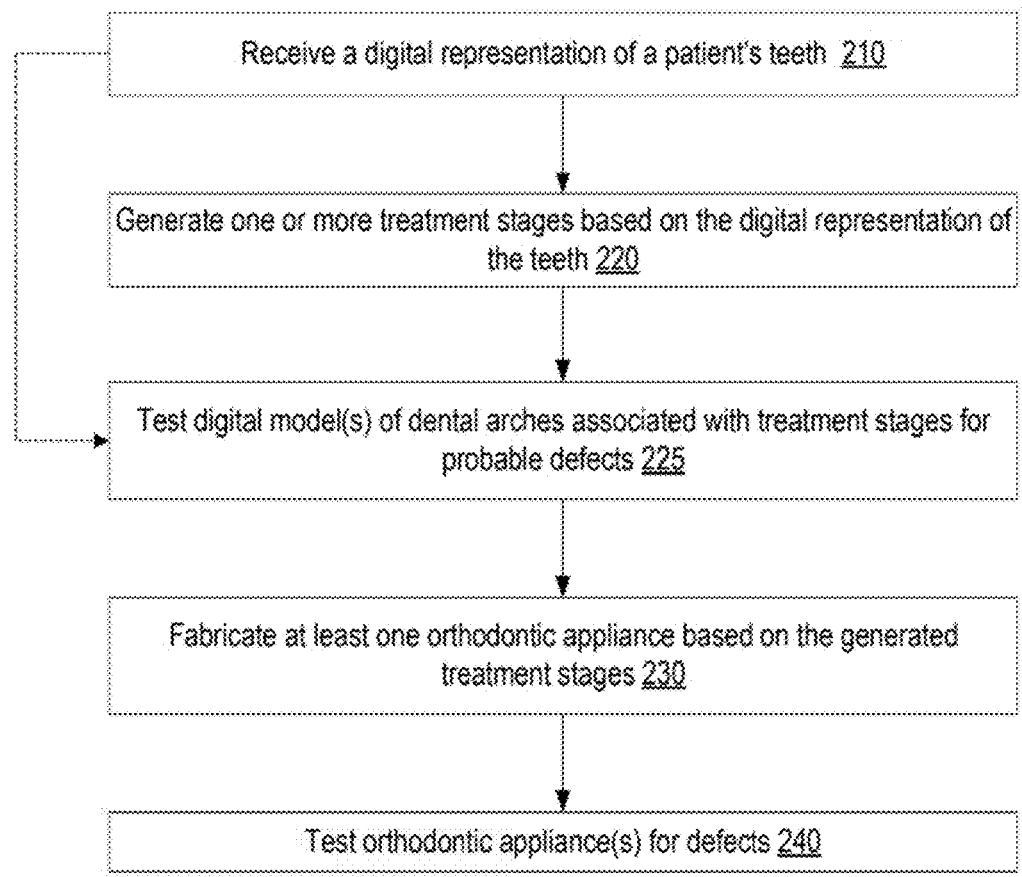
FIG. 2 illustrates a method for digitally planning an orthodontic treatment, in accordance with embodiments.

FIG. 2 illustrates a method 200 for digitally planning an orthodontic treatment and/or design or fabrication of a dental appliance, in accordance with embodiments. The method 200 can be applied to any of the treatment procedures described herein and can be performed by any suitable data processing system.

In block 210, a digital representation of a patient's teeth is received. The digital representation may be a digital model of a dental arch of the patient at a particular stage in treatment, and can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.). In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

In block 220, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

At block 225, processing logic may test the virtual 3D models (digital models) of the dental arches for each of the treatment stages, as described with reference to block 135 of method 100.

In block 230, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

A clinician office, laboratory, manufacturing facility or other entity may receive the virtual 3D model of a dental arch, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Aligners may be formed from each mold and when applied to the teeth of the patient, may provide forces to move the patient's teeth as dictated by the treatment plan. The shape of each aligner is unique and customized for a particular patient and a particular treatment stage. In an example, the aligners can be pressure formed or thermoformed over the molds. Each mold may be used to fabricate an aligner that will apply forces to the patient's teeth at a particular stage of the orthodontic treatment. The aligners each have teeth-receiving cavities that receive and resiliently reposition the teeth in accordance with a particular treatment stage.

In one embodiment, a sheet of material is pressure formed or thermoformed over the mold. The sheet may be, for example, a sheet of plastic (e.g., an elastic thermoplastic, a sheet of polymeric material, etc.). To thermoform the dental appliance over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the dental appliance. This may facilitate later removal of the mold from the dental appliance.

In some instances, staging of various arrangements or treatment stages may not be necessary for design and/or fabrication of an appliance. As illustrated by the dashed line in FIG. 2, design and/or fabrication of an orthodontic appliance, and perhaps a particular orthodontic treatment, may include use of a representation of the patient's teeth (e.g., receive a digital representation of the patient's teeth 210), followed by design and/or fabrication of an orthodontic appliance based on a representation of the patient's teeth in the arrangement represented by the received representation.

In some embodiments, a mold of a patient's dental arch may be fabricated and a dental appliance may be formed over the mold. The fabrication of the mold may be performed by processing logic of a computing device, such as the computing device in FIG. 11. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing a computer aided drafting (CAD) program or module.

After an aligner is formed over a mold for a treatment stage, that aligner is subsequently trimmed along a cutline (also referred to as a trim line) and the aligner may be removed from the mold. The processing logic may determine a cutline for the aligner. The determination of the cutline(s) may be made based on the virtual 3D model of the dental arch at a particular treatment stage, based on a virtual 3D model of the aligner to be formed over the dental arch, or a combination of a virtual 3D model of the dental arch and a virtual 3D model of the aligner. The location and shape of the cutline can be important to the functionality of the aligner (e.g., an ability of the aligner to apply desired forces to a patient's teeth) as well as the fit and comfort of the aligner. For dental appliances such as orthodontic aligners, orthodontic retainers and orthodontic splints, the trimming of the dental appliance may play a role in the efficacy of the dental appliance for its intended purpose (e.g., aligning, retaining or positioning one or more teeth of a patient) as well as the fit of the dental appliance on a patient's dental arch. For example, if too much of the dental appliance is trimmed, then the dental appliance may lose rigidity and an ability of the dental appliance to exert force on a patient's teeth may be compromised.

On the other hand, if too little of the dental appliance is trimmed, then portions of the dental appliance may impinge on a patient's gums and cause discomfort, swelling, and/or other dental issues. Additionally, if too little of the dental appliance is trimmed at a location, then the dental appliance may be too rigid at that location. In some embodiments, the cutline may be a straight line across the aligner at the gingival line, below the gingival line, or above the gingival line. In some embodiments, the cutline may be a gingival cutline that represents an interface between an aligner and a patient's gingiva. In such embodiments, the cutline controls a distance between an edge of the aligner and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the dental appliance will touch a tooth and on the gum line (e.g., touching the gum) in the interproximal regions between teeth. Accordingly, it is important that the dental appliance be trimmed along a predetermined cutline.

At block 240, processing logic tests the one or more orthodontic appliances for any defects. Testing of an orthodontic appliance may be performed by generating one or more images of the orthodontic appliance and then performing image processing operations on the orthodontic appliance as described herein below. The image processing may result in detection of one or more defects, such as hairline fractures and/or cracks in the orthodontic appliance that are difficult to detect visually. If defects are found for any of the orthodontic appliances, then a new copy of the orthodontic appliance may be manufactured to produce a copy that is defect free. In some instances, a digital model of a mold used to manufacture the orthodontic appliance is modified prior to generation of the new orthodontic appliance.

Figure 3:
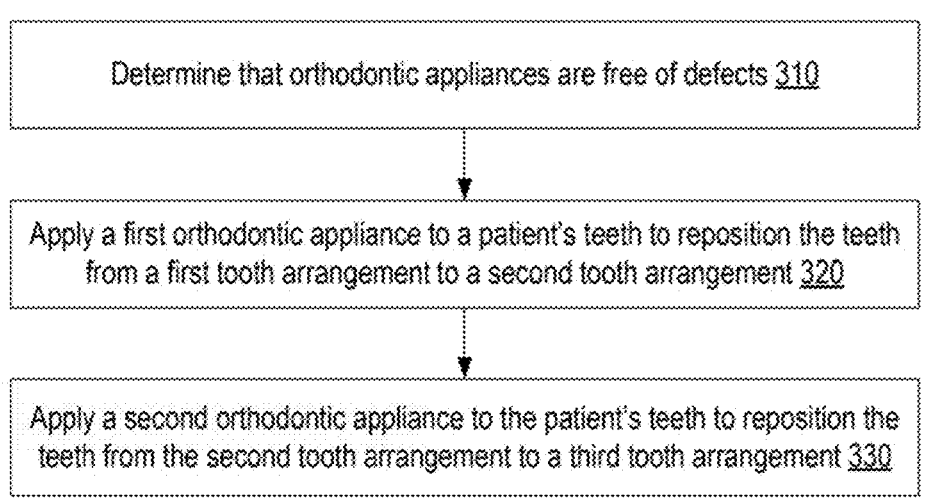
FIG. 3 illustrates a method of orthodontic treatment using a plurality of appliances, in accordance with embodiments.

FIG. 3 illustrates a method 300 of orthodontic treatment using a plurality of appliances, in accordance with embodiments. The method 300 can be practiced using a customized orthodontic appliance or appliance set generated based on a virtual 3D model of a patient's dental arch. The virtual 3D model may have been generated using intraoral images that were processed and optionally modified in accordance with embodiments described herein. At block 310 of method 300, a determination is made that all of the orthodontic appliances in a set of orthodontic appliances are free of defects. This determination may be made in accordance with embodiments discussed herein below.

In block 320, a first orthodontic appliance is applied to a patient's teeth in order to reposition the teeth from a first tooth arrangement to a second tooth arrangement. In block 330, a second orthodontic appliance is applied to the patient's teeth in order to reposition the teeth from the second tooth arrangement to a third tooth arrangement.

The method 300 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 4A:
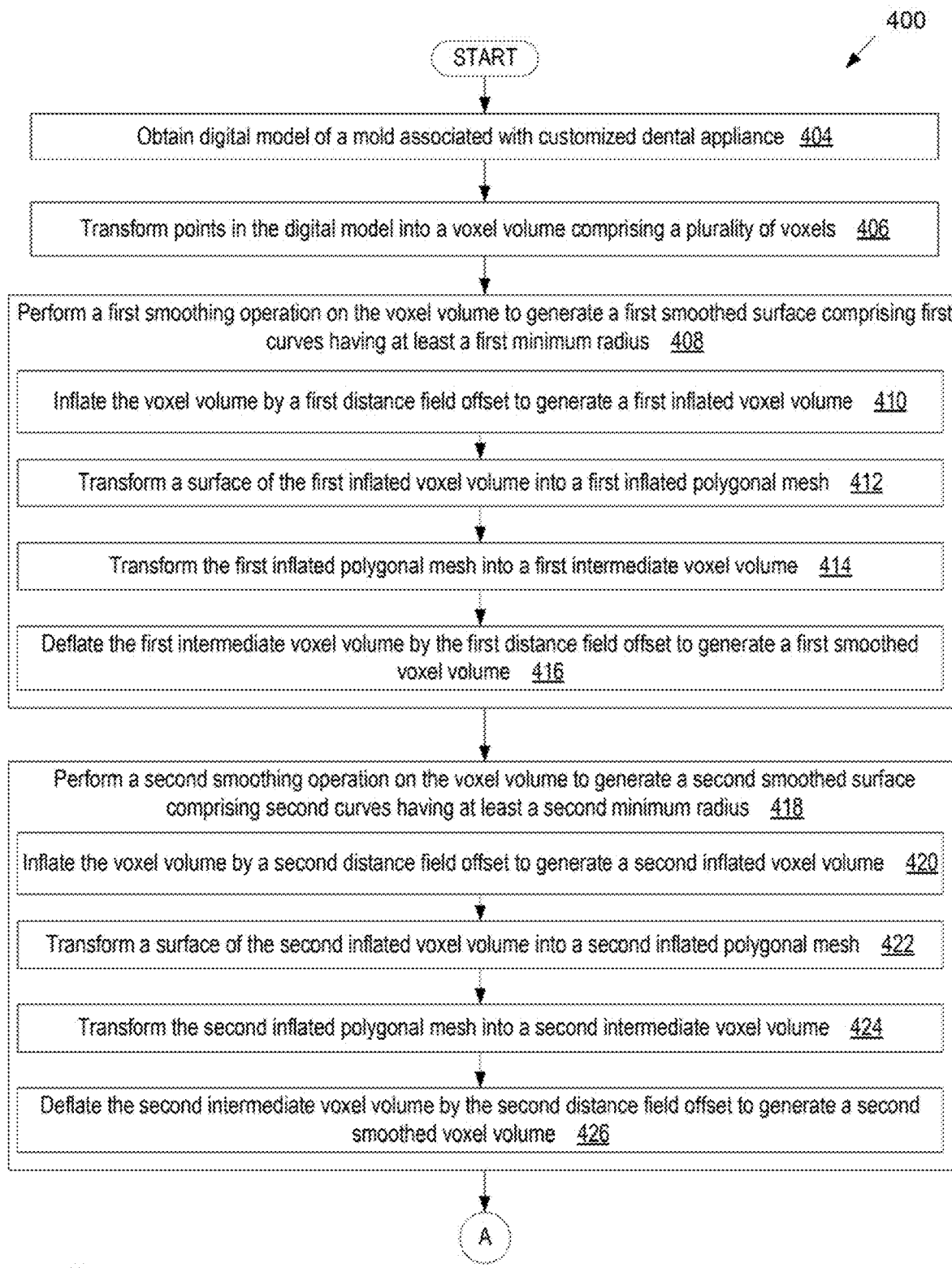
FIGS. 4A-4B illustrate a method of testing a digital model associated with a customized dental appliance for defects, in accordance with embodiments.
Figure 4B:
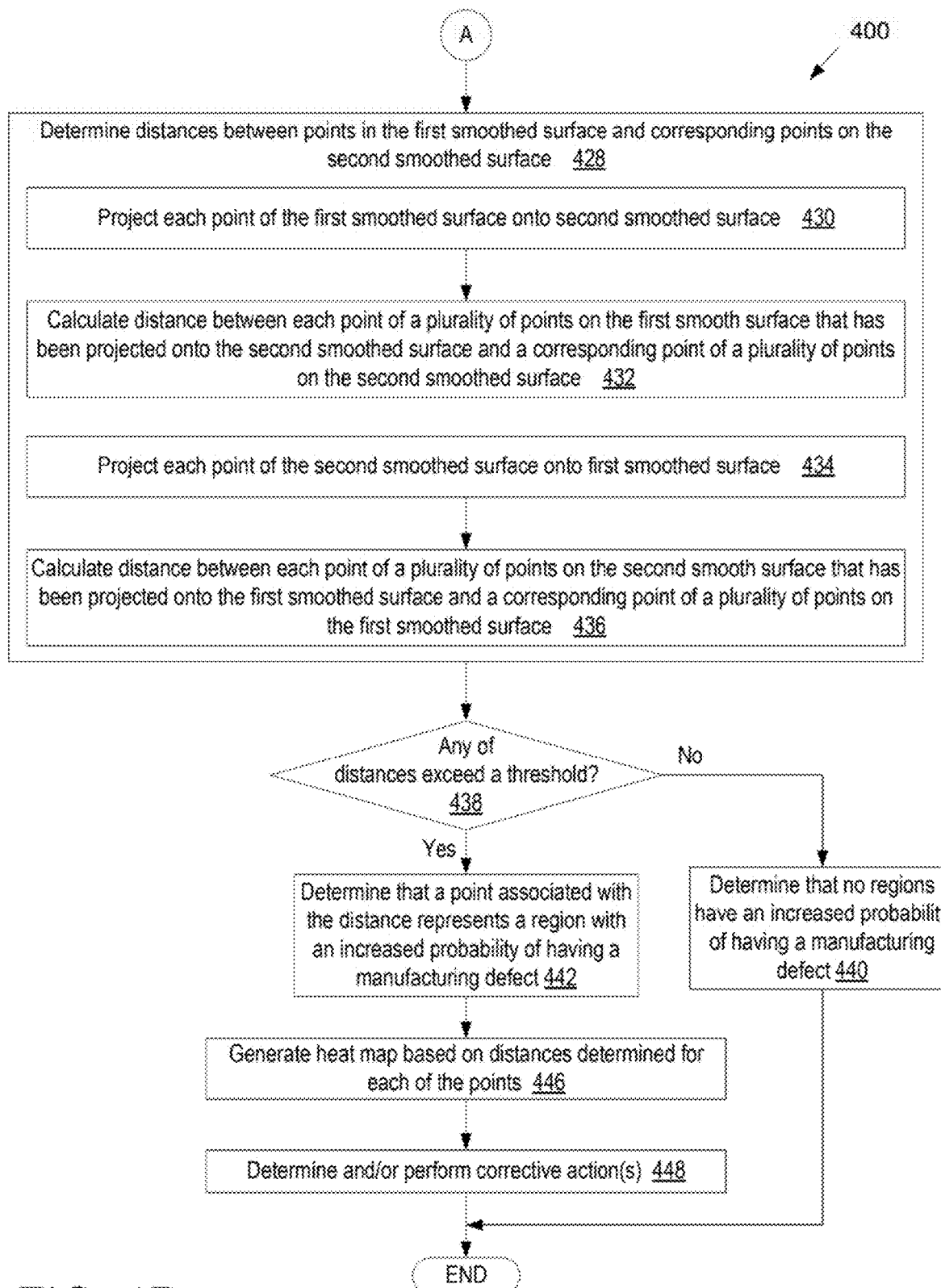

FIGS. 4A-4B illustrate a method 400 of testing a digital model associated with a customized dental appliance for defects, in accordance with embodiments. One or more operations of method 400 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 400 may be performed by a processing device executing a defect detector 1150 of FIG. 11. It should be noted that the method 400 may be performed for each unique aligner that is manufactured for each patient's treatment plan or for a subset of unique aligners.

At block 404 of method 400, processing logic may receive or otherwise obtain a digital file associated with a dental appliance that is customized for a dental arch of a patient. In some embodiments, the digital file may include a digital model of a dental arch, which is also a digital model of a mold associated with the customized dental appliance (e.g., of a mold used to manufacture the dental appliance).

At block 406, processing logic transforms the points in the digital model (e.g., including points representing teeth and/or gingiva) into a voxel volume comprising a plurality of voxels. A voxel volume may refer to a volume or three-dimensional (3D) object that includes multiple voxels that fill the volume or 3D object. A voxel (also referred to as a "volumetric pixel" or "volume pixel" herein), is the three-dimensional (3D) equivalent of a pixel. In embodiments, a voxel may be a polygon, such as a cube. In embodiments, a voxel may be the smallest distinguishable element of a 3D object, such as the voxel volume. In embodiments, a voxel can be a volume element that represents a specific grid value in 3D space. In embodiments, the selected points can be scalar values. A rasterization operation can be performed on the selected points. In embodiments, the rasterization operation transforms the selected points (e.g., scalar values) into voxels to create a voxel volume. In some embodiments, the selected points can outline an outer surface of a voxel volume. Performing the rasterization operation on the selected points creates a volumetric voxel surface and the rasterization process further fills the volumetric voxel surface with voxels to generate the voxel volume.

At block 408, processing logic performs a first smoothing operation on the voxel volume to generate a first smoothed surface comprising first curves having a first minimum radius. The first minimum radius may represent a minimum possible radius of a polymeric (e.g., plastic) material used to manufacture the dental appliance in a thermoforming process. In embodiments, the first minimum radius is between about 0.5 mm and 1.5 mm. In one embodiment, the first minimum radius is about 0.7 mm. In embodiments, the voxel volume is manipulated in a smoothing operation so that the edges and corners are smoothed. In embodiments, the smoothing operation smoothes the voxel volume so that surface vertices (e.g., corners or edges) are smoothed to have a radius of curvature greater than a first threshold amount (e.g., greater than or equal to 0.7 mm). In some embodiments, the smoothing operation inflates and subsequently deflates the voxel volume to reduce corners or edges and increase the radius of curvature in the updated surface of the virtual model. In some embodiments, after the smoothing operation is performed on the voxel volume, the resultant voxel volume can be further transformed into a scalar volumetric surface (e.g., polygonal mesh) where all surface vertices have a first minimum radius of curvature.

In one embodiment, performing the first smoothing operation includes performing the operations of blocks 410-416. At block 410, processing logic inflates (i.e., expands) the voxel volume by a first distance field (e.g., of about 0.5-1.5 mm, or about 0.7 mm) to generate a first inflated voxel volume. In some embodiments, the surface of the voxel volume is inflated by a positive distance field offset (R) (also referred to as "voxel field" herein) to generate the inflated voxel volume. In embodiments, the positive distance field offset can be a distance along a line that is normal to the outer surface of the outer voxels of the voxel volume and that extends outward from the surface. Similarly, a negative distance field offset ($R^1$) can be a distance along a line that is normal to the outer surface of the outer voxels of the voxel volume and that extends inwards (into the voxel volume) from the surface.

In some embodiments, inflating the voxel volume may be performed by evaluating a distance of each voxel (voxels within the voxel volume and voxels outside the voxel volume) from the surface (e.g., outer surface) of the voxel volume, and scoring each voxel based on the distance from the surface. Voxels on the surface of the voxel volume can have a low score (e.g., score of 0) and voxels away from the surface can have a higher score. The further away a voxel is from the surface of voxel volume the higher the score. As such, inflating a voxel volume by a positive distance field offset can be performed by selecting voxels having a particular score, which indicates that the voxels are a particular distance from the original surface of the voxel volume. The selected voxels having the particular score can become the outer surface of the inflated voxel volume.

At block 412, processing logic transforms a surface of the first inflated voxel volume into a first inflated polygonal mesh (e.g., such as a triangular mesh) or other inflated volumetric surface. The polygonal mesh can refer to multiple polygons that are linked or contact one another to form an outer surface of the 3D object. Transforming the inflated voxel volume can transform the voxels on the outer surface of the inflated voxel volume into one or more polygons that are represented by scalar values. In embodiments, a volume transformation operation can be performed, such as a marching cubes operation that iteratively creates triangular surfaces for a 3D object. The volume transformation operation can "march" over all the voxels of voxel volume. The volume transformation operation determines whether a voxel has a vertex (e.g., corners) or an edge (e.g., where two sides of the voxel meet) that lie inside the voxel volume (e.g. not exposed to the voxel surface) and a vertex or an edge that is exposed to the surface of the voxel volume. If the volume transformation operation determines the above, the volume transformation operation transforms the voxel into one or more triangular surfaces. If the voxel's vertices and edges are entirely inside the voxel volume, the voxel is not transformed. If the voxel's vertices and edges are entirely outside the surface of the voxel volume, the voxel is not transformed.

At block 414, processing logic transforms the first inflated polygonal mesh into a first intermediate voxel volume. For example, the scalar values of the polygonal mesh can be transformed into an intermediate voxel volume using a rasterization operation.

At block 416, processing logic deflates the first intermediate voxel volume by approximately the first distance field offset (with a negative offset) to generate a first smoothed voxel volume. Corners that existed in the initial voxel volume have been smoothed in the first smoothed voxel volume. In some embodiments, deflating the first intermediate voxel volume can be performed by using a negative distance field offset to generate the first smoothed voxel volume, as described above. In some embodiments, the negative distance field offset is the same distance as the positive distance field offset used at block 410.

In some embodiments, subsequent to performing the smoothing operation, a geometry of the updated digital model can be determined by transforming the surface of the smoothed voxel volume into a polygonal mesh. The volume transformation operation may be similar to the operation described above. In some embodiments, the minimum radius is may be based on the value of the distance field that was used to inflate the voxel volume.

At block 418, processing logic performs a second smoothing operation on the voxel volume to generate a second smoothed surface comprising second curves having a second minimum radius. The second minimum radius may be larger than the first minimum radius in embodiments. The second minimum radius may represent a threshold defined by a manufacturing process to decrease a probability of breakage to a minimum level. In one embodiment, the second minimum radius is approximately equal to a thickness of an aligner (or other dental appliance) that will be manufactured based on the digital model of the dental arch. In some embodiments, the second minimum radius is about 2 mm. In some embodiments, the second minimum radius is about 1.8-2.5 mm.

In one embodiment, performing the second smoothing operation includes performing the operations of blocks 420-426. At block 420, processing logic inflates (i.e., expands) the voxel volume by a second distance field to generate a second inflated voxel volume. In embodiments, the second distance field is about 1.8-2.5 mm, or about 2 mm. In embodiments, the second distance field is a positive distance field that is greater than the first distance field applied at block 410. In embodiments, the second distance field is about equal to the thickness of an aligner to be manufactured. As noted above, the larger distance field produces a larger radius of curvature than the smaller first distance field.

At block 422, processing logic transforms a surface of the second inflated voxel volume into a second inflated polygonal mesh (e.g., such as a triangular mesh) or other inflated volumetric surface. At block 424, processing logic transforms the second inflated polygonal mesh into a second intermediate voxel volume. For example, the scalar values of the polygonal mesh can be transformed into an intermediate voxel volume using a rasterization operation. At block 426, processing logic deflates the second intermediate voxel volume by approximately the second distance field offset (with a negative offset) to generate a second smoothed voxel volume. Corners that existed in the initial voxel volume have been smoothed in the second smoothed voxel volume, but with a different minimum radius than produced by the first smoothed voxel volume. In some embodiments, deflating the second intermediate voxel volume can be performed by using a negative distance field offset to generate the second smoothed voxel volume, as described above. In some embodiments, the negative distance field offset is the same distance as the positive distance field offset used at block 420.

In some embodiments, subsequent to performing the smoothing operation, a geometry of the updated digital model can be determined by transforming the surface of the smoothed voxel volume into a polygonal mesh. The volume transformation operation may be similar to the operation described above.

At block 428, processing logic determines distances between points in the first smoothed surface and corresponding points in the second smoothed surface. The greater the distance between two corresponding points (one from the first smoothed surface and a corresponding point from the second smoothed surface), the greater the risk of a crack developing because a polymeric material will be stretched thinner at this point during thermoforming. In one embodiment, this includes projecting each point of the first smoothed surface onto the second smoothed surface at block 430, and then calculating distances between each point of a plurality of points on the first smoothed surface that has been projected onto the second smoothed surface and a corresponding point of a plurality of points on the second smoothed surface at block 432. The may identify regions where overstretching could occur. In one embodiment, this includes projecting each point of the second smoothed surface onto the first smoothed surface at block 434, and then calculating distances between each point of a plurality of points on the second smoothed surface that has been projected onto the first smoothed surface and a corresponding point of a plurality of points on the first smoothed surface at block 436. This may identify regions where webbing is likely to occur. Webbing is an unintended fold in the dental appliance. The calculated distance (or distances) between corresponding points may reflect local plastic deformation caused during thermoforming. High plastic deformation may equate to a high probability of perforation or breakage.

At block 438, processing logic determines whether any of the distances exceed a threshold. In one embodiment, the threshold is between about 0.8 mm and about 1.8 mm. In one embodiment, the threshold is about 1.3 mm. In some embodiments, multiple different thresholds are used. Processing logic may determine whether a lower threshold is exceeded, whether an intermediate threshold is exceeded, and/or whether an upper threshold is exceeded, for example. A lower threshold may be about 0 mm in embodiments. Each threshold may be associated with a different probability that a defect will occur. For example, points that exceed the lower threshold but not the intermediate threshold may be associated with a low probability of failure, whereas points that exceed the upper threshold may be associated with a high probability of failure. If a threshold has been exceeded for a point, then the method continues to block 442. If the threshold is not exceeded for any point, then the method proceeds to block 440.

At block 440, processing logic determines that there are no regions on the digital model of the dental arch that are associated with an increased probability of having a manufacturing defect.

At block 442, processing logic determines that a point associated with a distance that exceeded the threshold (or one of multiple thresholds) represents a region of the digital model of the dental arch that is associated with an increased probability of having a manufacturing defect. At block 446, processing logic generates a heat map based on distances determined for each of the points on the surface of the digital model of the dental arch. In the heat map, a first color or pattern may indicate a low or nearly zero risk of defect, a second color or pattern may indicate a medium risk of defect, and a third color or pattern may indicate a high risk of defect. The greater the distance between a point on one of the smoothed surfaces and a corresponding point projected from another of the smoothed surfaces, the greater the chance of a defect. These risks may be shown visually via the heat map. The heat map provides an indicator for each point that indicates whether the point is at risk for a manufacturing defect. In one embodiment, a different color is assigned to each distance value. For example, green may be associated with values of 0, blue shades may be associated with values of less than 1.3 mm, and red shades may be associated with values of equal to or greater than 1.3 mm. This may provide a continuous transformation of color from green to red through blue.

At block 448, processing logic may determine one or more corrective actions to perform to eliminate or reduce the chance of defects at the identified regions with an increased risk of defects. Processing logic may also notify a dental practitioner of the one or more corrective actions and/or may perform the one or more corrective actions. Some example corrective actions that may be performed include updating the digital model of the mold to limit the manufacturing defect by at least one of adding virtual filler material, revising a cutline, or modifying one or more attachments of the mold.

Figure 5A:
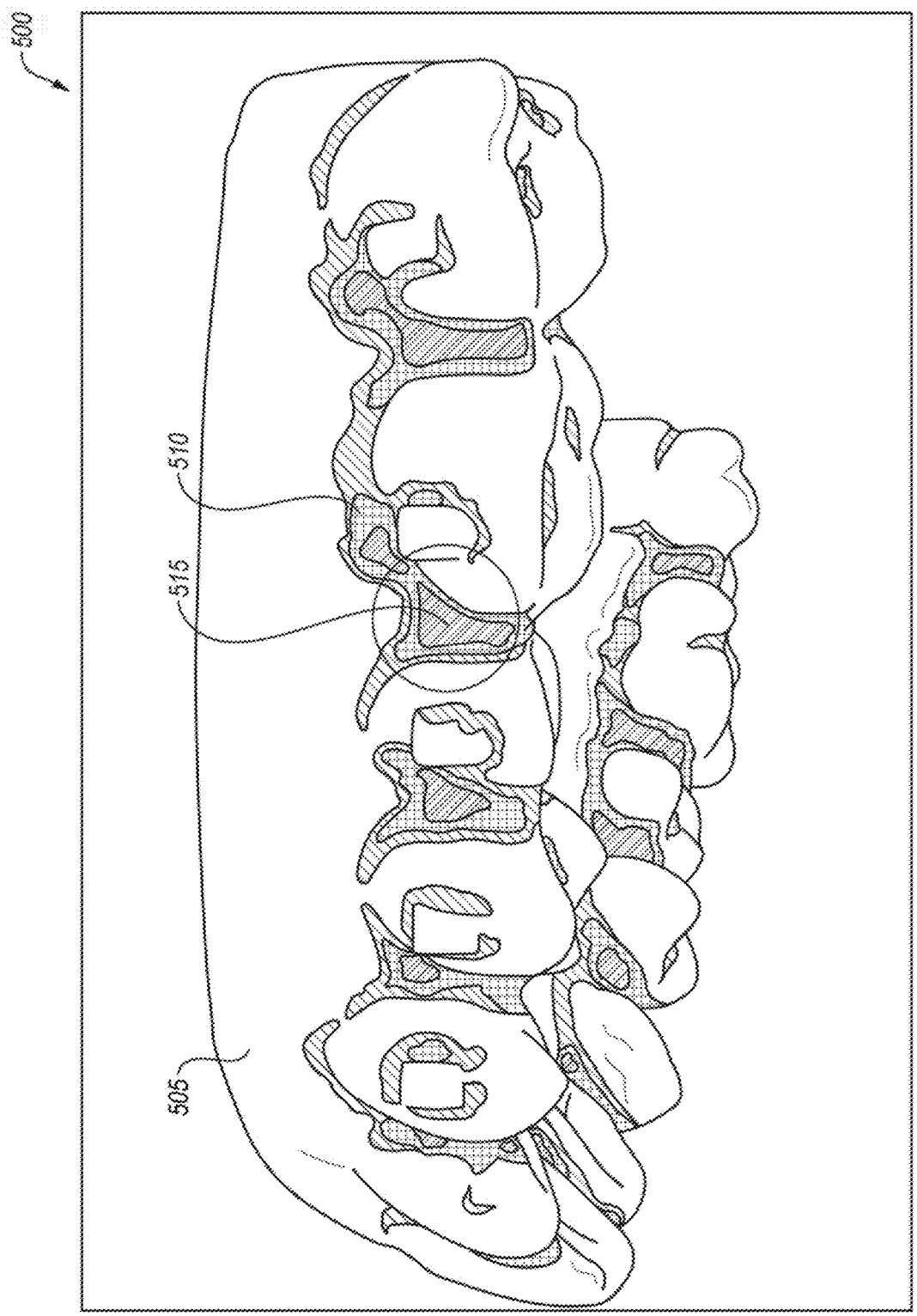
FIG. 5A illustrates an example user interface showing a digital model of a dental arch with identified regions having a high probability of developing defects, in accordance with one embodiment.

FIG. 5A illustrates an example user interface showing a digital model 500 of a dental arch with identified regions having a high probability of developing defects, in accordance with one embodiment. The digital model 500 is presented as a heat map showing first regions 505 in which the distance between corresponding points from the two smoothed surfaces are zero or approximately zero, second regions 510 in which the distance between corresponding points from the two smoothed surfaces exceed a first threshold and third regions 515 in which the distance between corresponding points from the two smoothed surfaces exceed a second threshold (e.g., exceed 0 mm, but less than 1.3 mm). The third regions 515 represent areas in which plastic will be overstretched by the thermoforming process (e.g., where distances exceed 1.3 mm), which increases the risk of defects at those regions. The heat map is produced based on projecting points from the first smoothed surface onto the second smoothed surface and then computing distances.

Figure 5B:
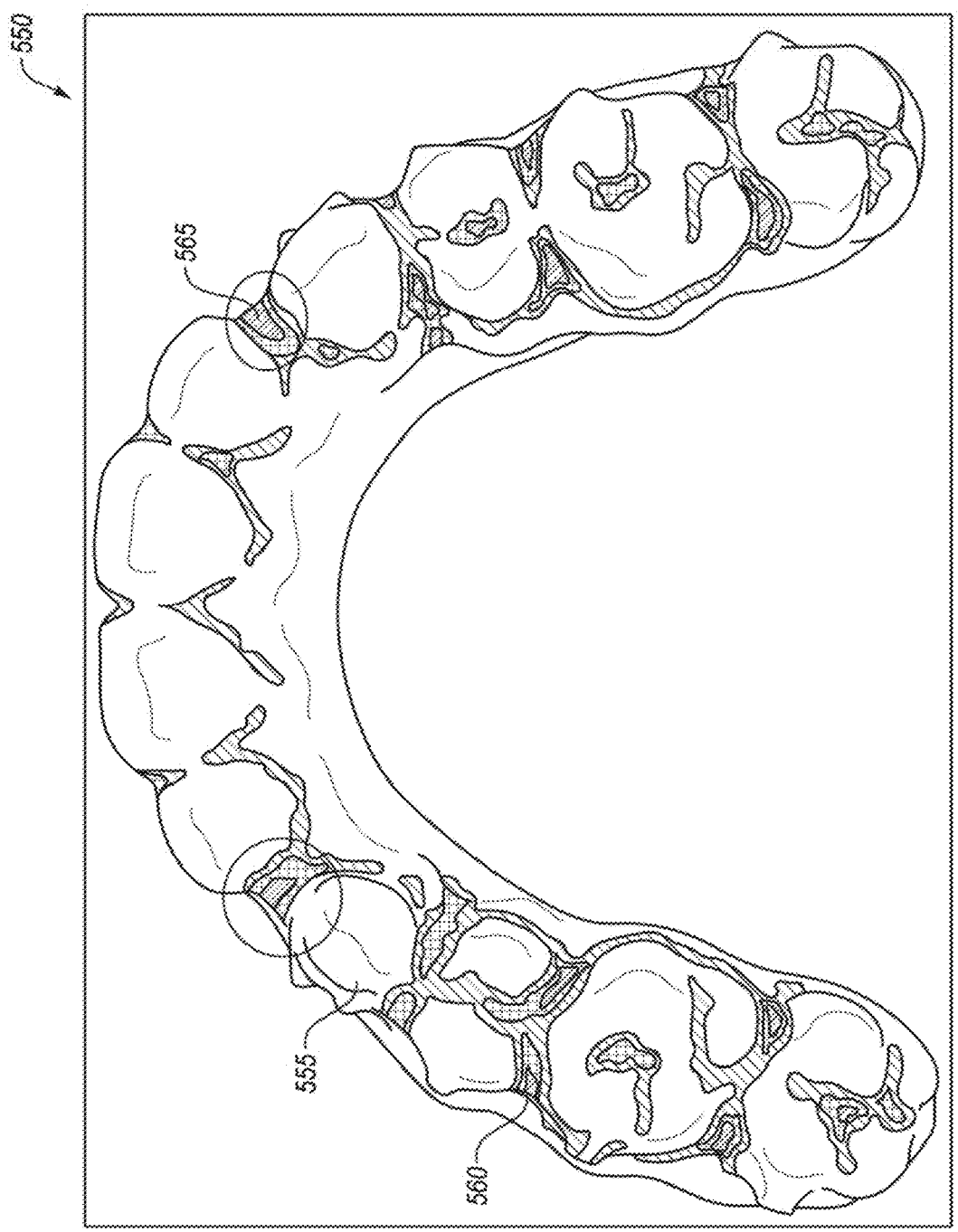
FIG. 5B illustrates another example user interface showing a digital model of a dental arch with identified regions having a high probability of developing defects, in accordance with one embodiment.

FIG. 5B illustrates another example user interface showing a digital model 550 of a dental arch with identified regions having a high probability of developing defects, in accordance with one embodiment. The digital model 550 is presented as a heat map showing first regions 555 in which the distance between corresponding points from the two smoothed surfaces are zero or approximately zero, second regions 560 in which the distance between corresponding points from the two smoothed surfaces exceed a first threshold and third regions 565 in which the distance between corresponding points from the two smoothed surfaces exceed a second threshold. The third regions 565 represent areas in which plastic will be pinched or crimped, producing webbing, which is one type of defect. The heat map is produced based on projecting points from the second smoothed surface onto the first smoothed surface and then computing distances.

Figure 6:
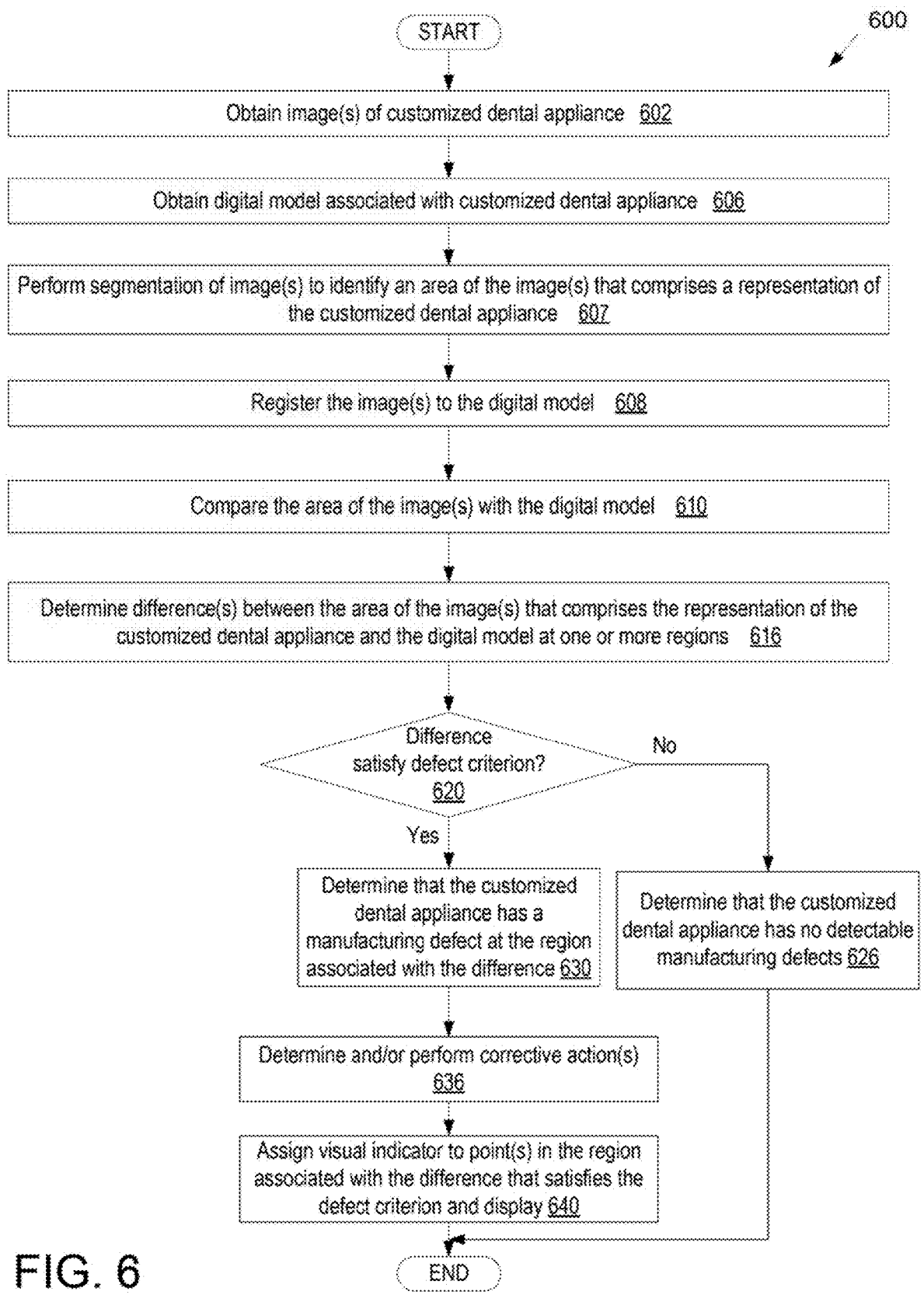
FIG. 6 illustrates a method of detecting defects in a dental appliance, in accordance with embodiments.

FIG. 6 illustrates a method 600 of detecting defects in a dental appliance, in accordance with embodiments. One or more operations of method 600 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 600 may be performed by a processing device executing a defect detector 1150 of FIG. 11. It should be noted that the method 600 may be performed for each unique aligner that is manufactured for each patient's treatment plan or for a subset of unique aligners. Whereas method 400 may be performed prior to manufacture of a dental appliance (e.g., orthodontic aligner) to predict areas in which defects will occur, method 600 is performed after a dental appliance has been manufactured to determine whether a defect has actually occurred during the manufacturing process.

At block 602, processing logic obtains one or more images of a customized dental appliance that was manufactured. The images may have been generated by an image-based quality control (IBQC) system, such as the IBQC system described in U.S. patent application Ser. No. 16/145,016, filed Sep. 27, 2018, which is herein incorporated by reference in its entirety. The images may include one or more top view images and/or one or more side view images of the customized dental appliance.

At block 606, processing logic obtains a digital model associated with the customized dental appliance. The digital model may be a digital model of a mold for a dental arch that was used to manufacture the dental appliance (e.g., that was used to print a physical 3D mold of the dental arch, over which the dental appliance may have been thermoformed). The digital model may alternatively be a digital model of the dental appliance itself. A digital model of the dental appliance may be obtained by manipulating a digital model of the mold and approximating a surface of the dental appliance. For example, in some embodiments, a surface of the digital model may be enlarged, inflated, or otherwise offset to approximate a surface (inner and/or outer surface) of the dental appliance. In some instances, the surface(s) of the digital model associated with the teeth and/or attachments and/or virtual fillers of the patient are enlarged, inflated, or offset. Optionally, an inner or outer surface of the dental appliance is determined and the other surface is approximated based on a thickness of the material used to form the dental appliance. In some cases where the dental appliance is to be formed by thermoforming a sheet of material over a physical mold, the approximated surfaces may take into account stretching and thinning of the material over certain parts of the mold. The digital model of the mold and/or of the dental appliance may be included in a digital file in embodiments.

At block 607, processing logic performs segmentation of the one or more images to identify an area of the image(s) that comprises a representation of the customized dental appliance. In some embodiments, the segmentation is performed according to the operations set forth in method 700 of FIG. 7.

At block 608, processing logic registers the one or more images to the digital model. In one embodiment, performing registration includes capturing 3D data of various points of a surface in the one or more images and the digital model, and registering the one or more images to the digital model by computing transformations between the images and the digital model. The images and the digital model may then be integrated into a common reference frame by applying appropriate transformations to points of each registered image (or of the digital model).

At block 610, processing logic compares the area of the images (the area that was determined to comprise the representation of the customized dental appliance) with the digital model of the dental appliance. At block 616, processing logic determines one or more differences between the area of the image(s) and the digital model at one or more regions. Differences may be determined by performing a pixel by pixel comparison. At block 620, processing logic determines whether any of the determined differences satisfy a defect criterion. A defect criterion may be satisfied if the difference comprises a line in the one or more images that is not depicted in the digital model. The line may represent a crack in the customized dental appliance. A defect criterion may also be satisfied if the difference comprises a difference in curvature between a line in the one or more images and a corresponding line in the digital model. If a determination is made that any of the identified differences satisfies a defect criterion, then the method continues to block 630. Otherwise the method proceeds to block 626.

At block 626, processing logic determines that the customized dental appliance does not include any detectable manufacturing defects.

At block 630, processing logic determines that the customized dental appliance has a manufacturing defect at the region associated with the difference that satisfies the defect criterion. At block 636, processing logic may determine one or more corrective actions to perform. Processing logic may also perform the one or more determined corrective actions. Processing logic may also notify a dental practitioner of the one or more corrective actions. Some example corrective actions that may be performed include updating the digital model of the dental arch for the mold used to manufacture the dental appliance to limit the manufacturing defect by at least one of adding virtual filler material, revising a cutline, or modifying one or more attachments of the mold. Corrective actions may also include manufacturing a replacement for the dental appliance having the identified defect. The replacement may be manufactured using the modified digital model or using the original digital model in embodiments.

In some embodiments, a user interface is provided, and an image of the dental appliance is shown in the user interface. Processing logic may assign a visual indicator to points in the region associated with the difference that satisfies the defect criterion at block 640 in some embodiments. This may enable a dental practitioner to easily identify where defects have occurred.

Figure 7:
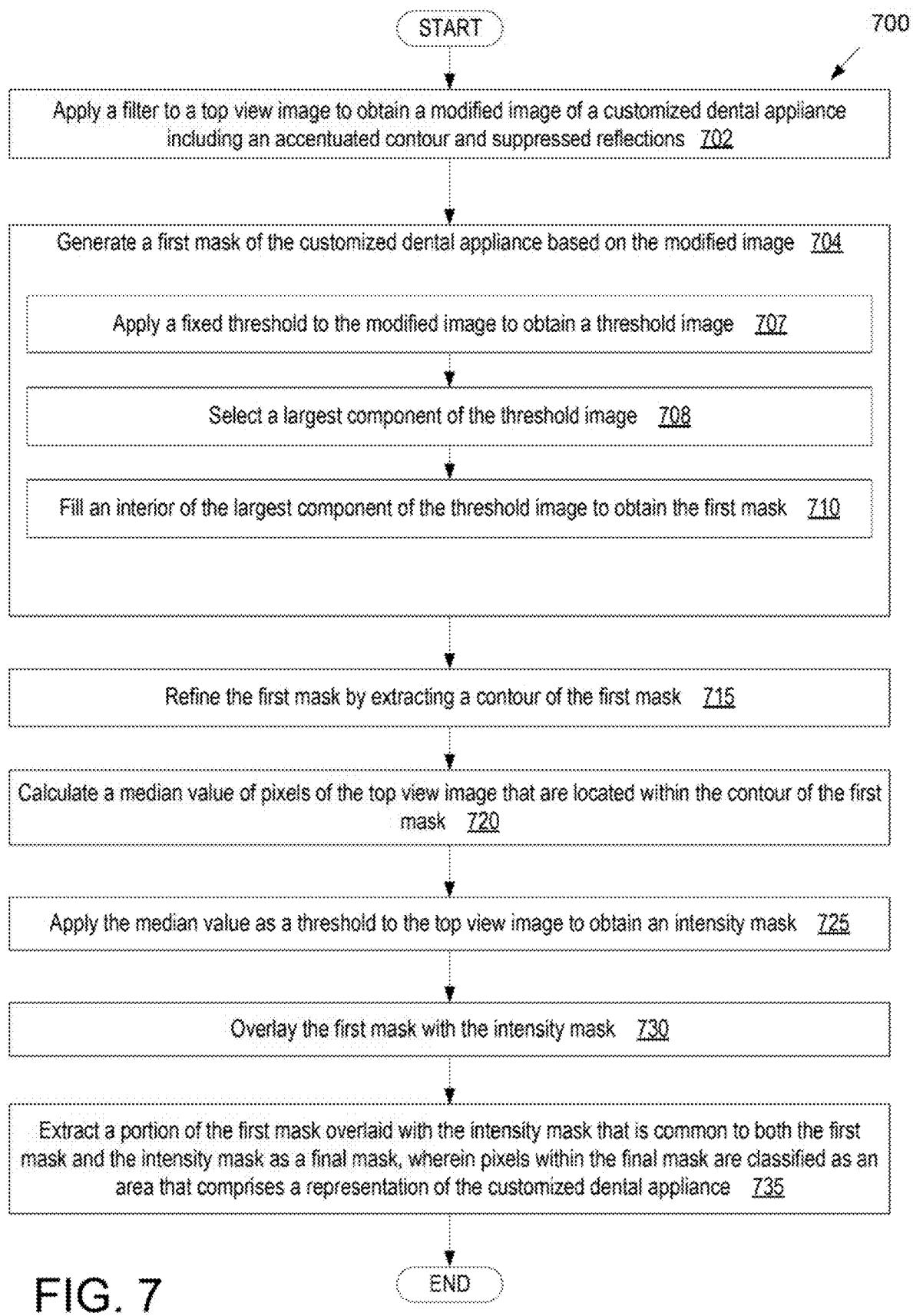
FIG. 7 illustrates a method of processing an image of a dental appliance to enable defect detection, in accordance with embodiments.

FIG. 7 illustrates a method 700 of processing an image of a dental appliance to enable defect detection (e.g., by performing segmentation), in accordance with embodiments. The image may be a top view image or a side view image of a dental appliance that was generated under dark-field lighting conditions. One or more operations of method 700 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 700 may be performed by a processing device executing a defect detector 1150 of FIG. 11.

Figure 8A:
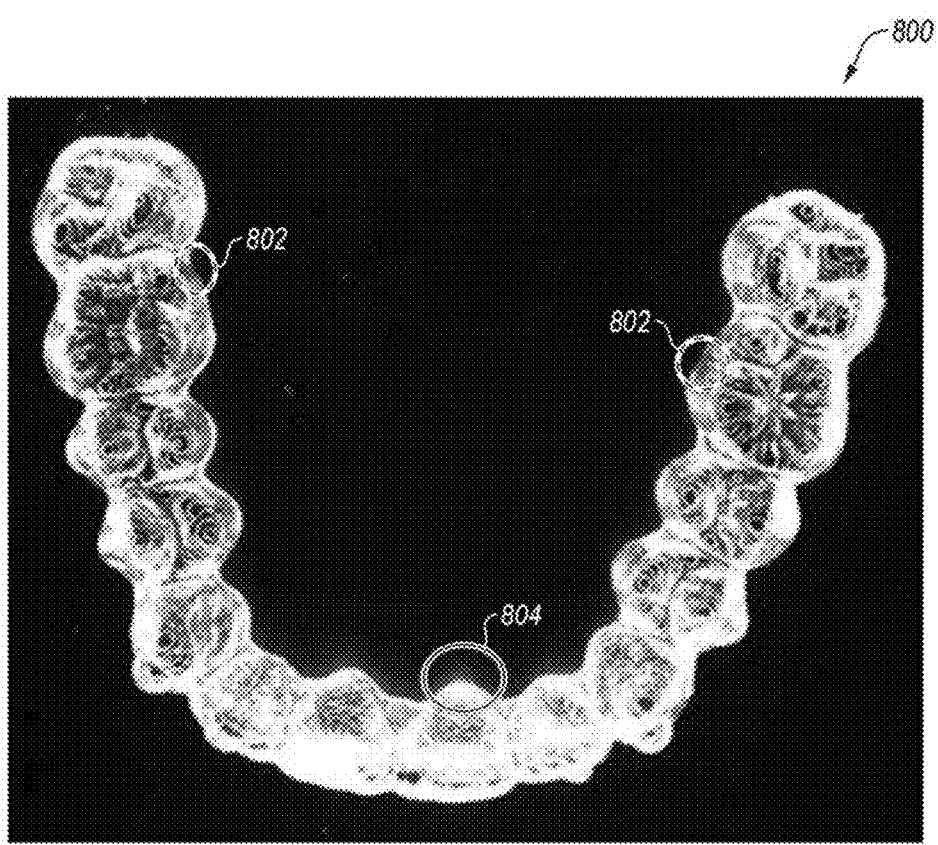
FIGS. 8A-8I illustrate views of an example image of a dental appliance during various stages of image processing, in accordance with one embodiment.

FIGS. 8A-8I illustrate views of an example top view image of a dental appliance during various stages of image processing as performed according to method 700, in accordance with one embodiment. FIG. 8A illustrates a top view image 800 of a dental appliance generated under dark-field lighting conditions. As shown, the image 800 has low contrast boundary regions 802 as well as reflections 804. Simple thresholding generally cannot be performed on images with such low contrast boundary regions and/or reflections without losing some portions of the dental appliance or adding additional material to the dental appliance in the image 800.

Figure 8B:
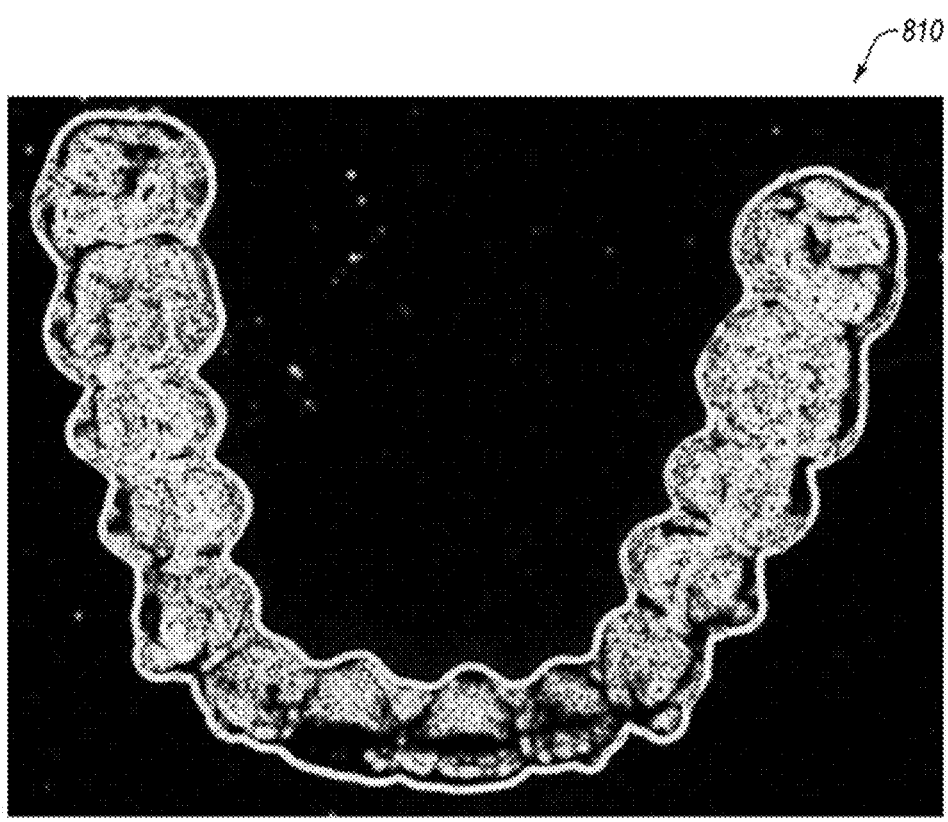

At block 702 of method 700, processing logic applies a filter to an image to obtain a modified image of a customized dental appliance including an accentuated contour and suppressed reflections. In one embodiment, the filter is a Laplacian of Gaussian (LoG) filter (a Gaussian filter followed by a Laplacian filter) or other suitable high-pass filter. In one embodiment, based on application of the filter, Gaussian smoothing is performed with a 7×7 kernel, followed by Laplacian sharpening, followed by taking an absolute value and scaling by $(k+2)^2/26$, where $k=7$ is the smoothing kernel size. The applied filter takes advantages of the fact that the boundary of the dental appliance is mostly sharp, and reflections don't have a sharp boundary in order to obtain an image in which a border is emphasized and reflections are suppressed. FIG. 8B illustrates a filtered image 810 that has been generated based on application of the filter specified at block 702 to image 800. As shown, the border of the dental appliance is emphasized and the reflections are suppressed in the filtered image 810.

At block 704, processing logic generates a first mask of the dental appliance based on the modified image. In one embodiment, the first mask is generated by applying a fixed threshold to the modified image to obtain a threshold image (block 707). Thresholding is the simplest method of image segregation. In one embodiment, binary thresholding is performed with a fixed threshold value. In one embodiment, the fixed threshold value is 2, though other fixed threshold values may also be used. Processing logic may then select a largest component of the threshold image (block 708). The component may be a continuous region with the same value or color (e.g., white color or value of 1) on the first mask. There should be one large component which corresponds to the first mask, and there may be smaller components, which may be caused, for example, by dust. Processing logic may then fill an interior of the largest component of the threshold image to obtain the first mask (block 710). Filling the interior may include replacing the values of some pixels within the selected component (e.g., pixels that are black) with new values that correspond to values of other pixels within the selected component (e.g., to make those pixels white). A flood fill algorithm may be used to fill the interior in embodiments.

Figure 8C:
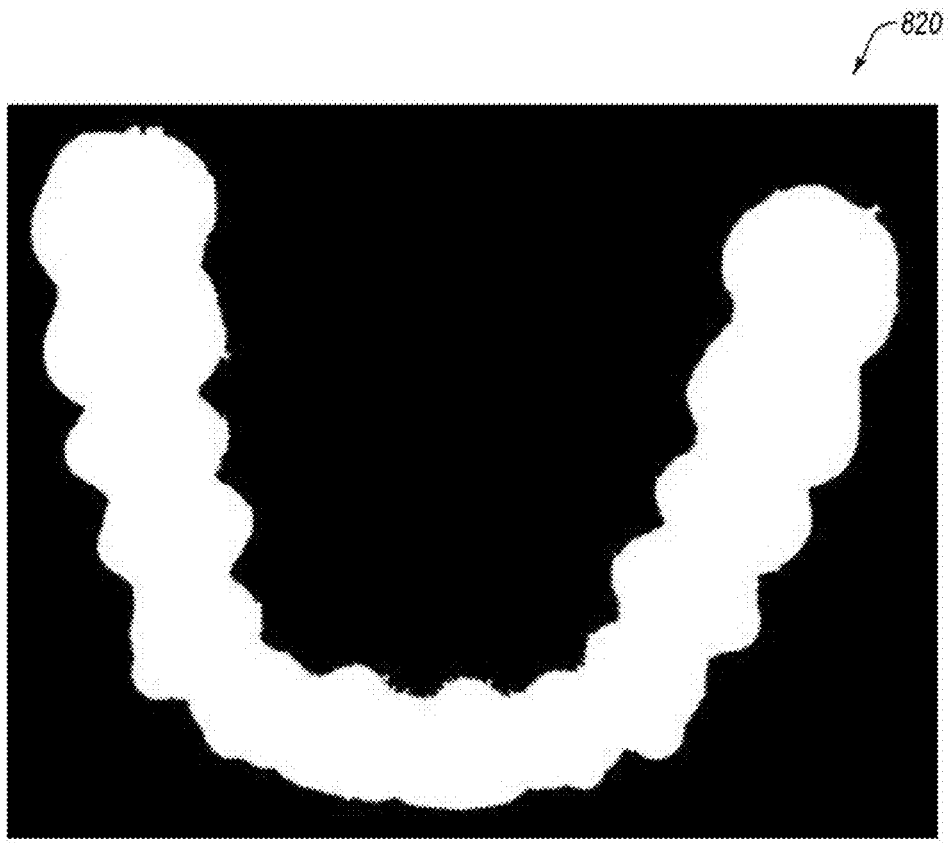
Figure 8D:
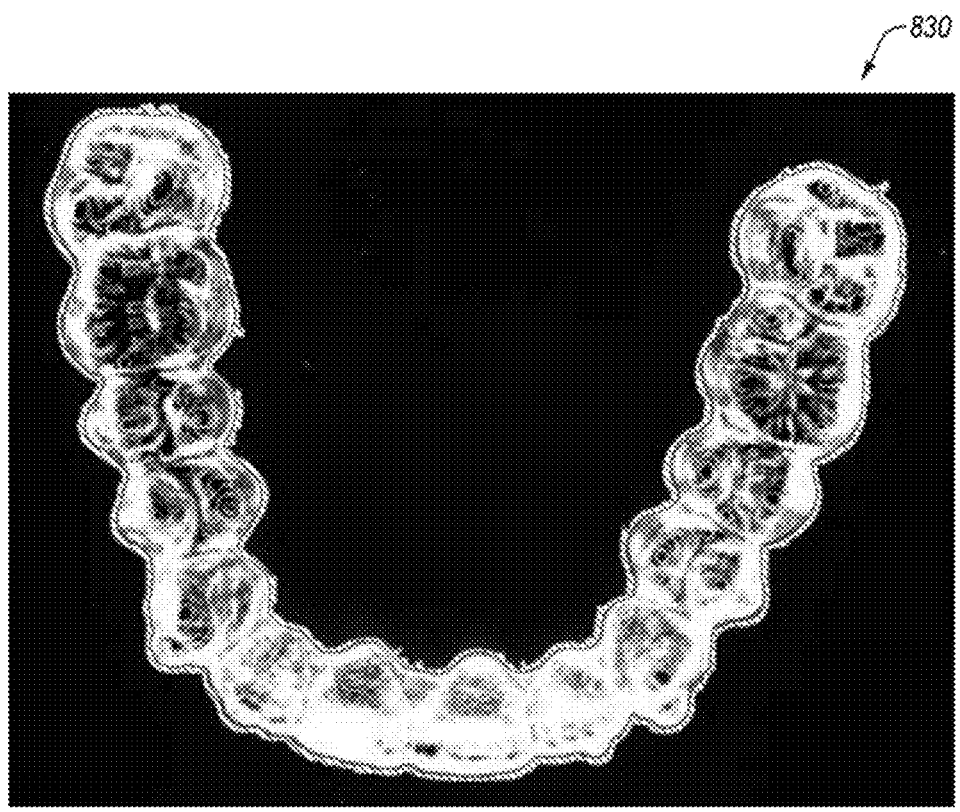

FIG. 8C illustrates a first mask 820 that has been generated from the filtered image 810 in accordance with block 704. In the first mask all pixels that are within the area associated with the dental appliance have a first value (e.g., a value of 1 or a color of white) and all other pixels that are not within the area have a second value (e.g., a value of 0 or a color of black). The first mask 820 may be slightly oversized in embodiments, as can be seen in the image 830 of FIG. 8D, which shows the first mask 820 overlaid on the top view image 800.

Figure 8E:
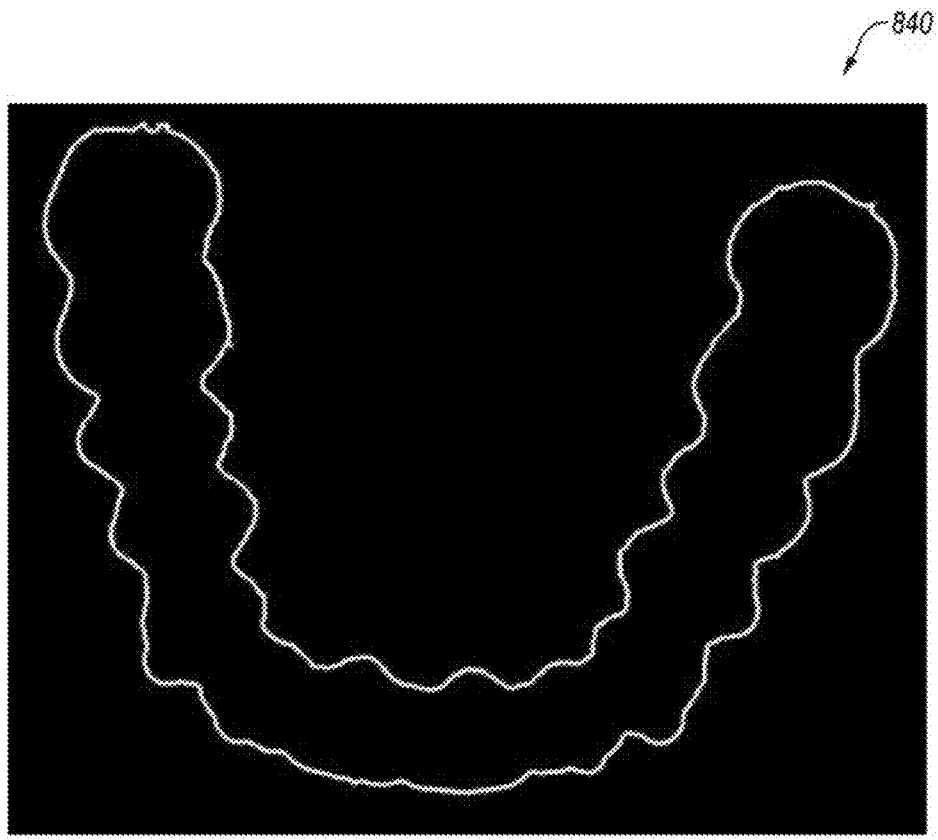

Accordingly, at block 715 processing logic refines the first mask 820 by extracting a contour or border of the first mask. FIG. 8E is an image 840 showing the border of the first mask 820. At block 720, processing logic calculates a median value of pixels of the top view image that are located within the contour of the first mask. Each pixel may have a value (e.g., a value ranging from 0 to 255). The larger the value, the brighter the pixel. For example, 0 may represent black and 255 may represent white.

Figure 8F:
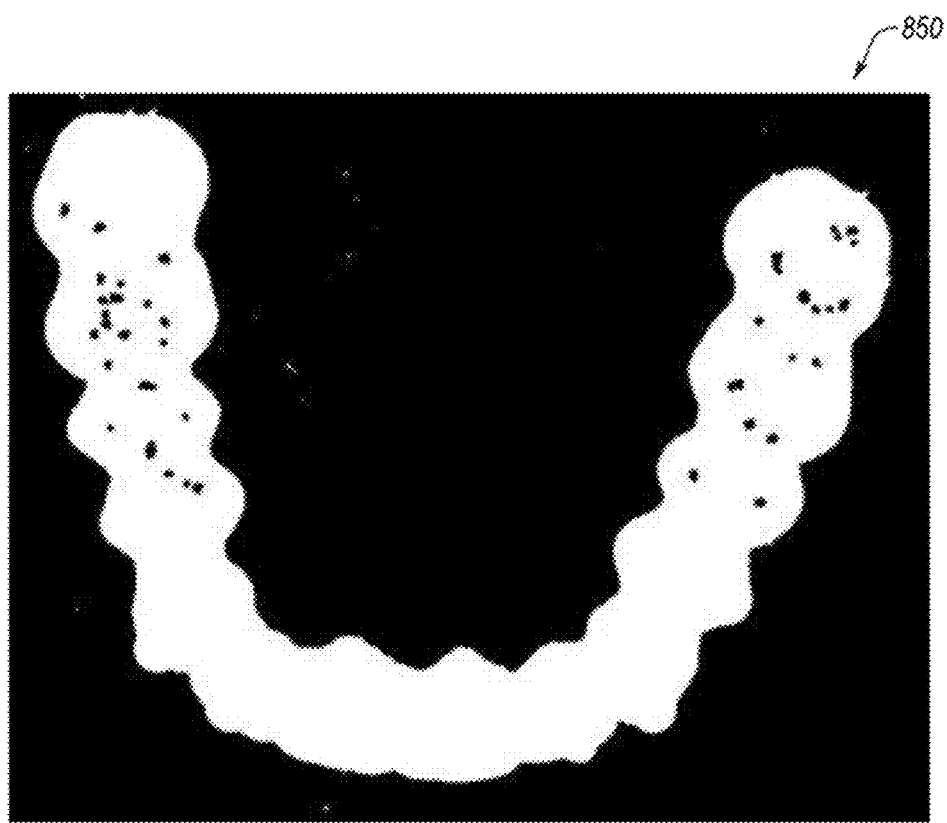
Figure 8G:
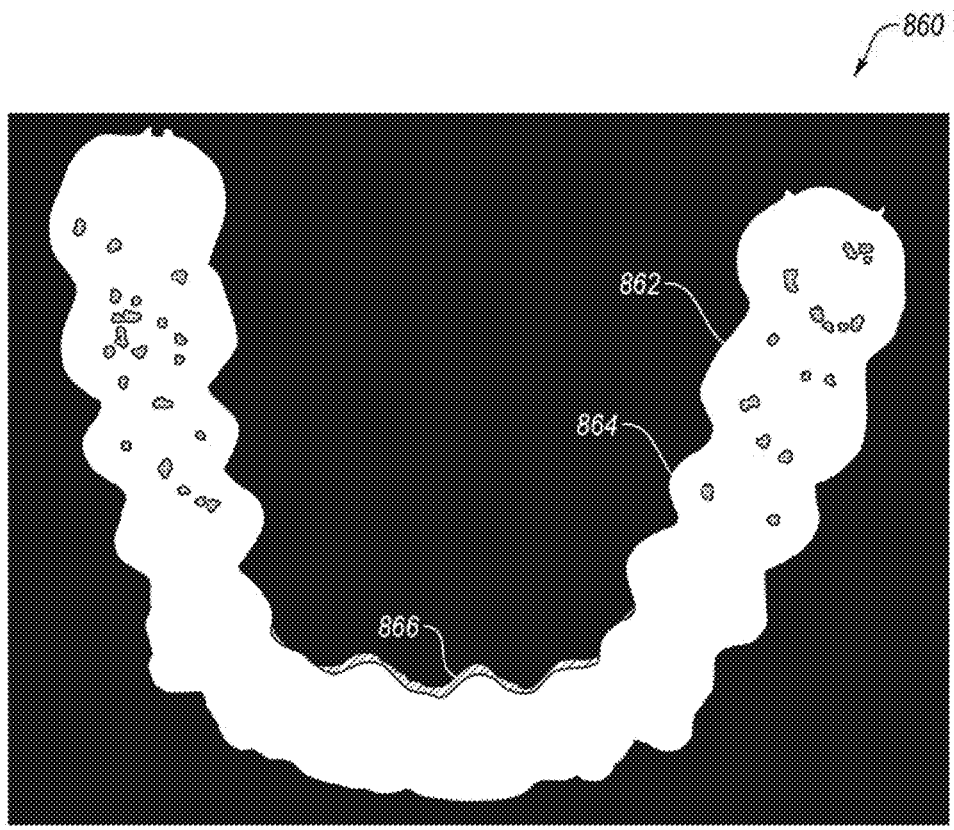

At block 725, processing logic applies the median value as a threshold to the top view image to obtain an intensity mask, which produces image 850 of FIG. 8F. At block 730, processing logic overlays the first mask with the intensity mask, as shown in the image 860 FIG. 8G. In image 860, areas that are common to the first mask and the intensity mask are region 862 shown with a first color and/or fill pattern, areas that are just represented in the first mask are region 864 shown with a second color and/or fill pattern, and areas that are just represented in the intensity mask are region 866 shown with a third color and/or fill pattern.

Figure 8H:
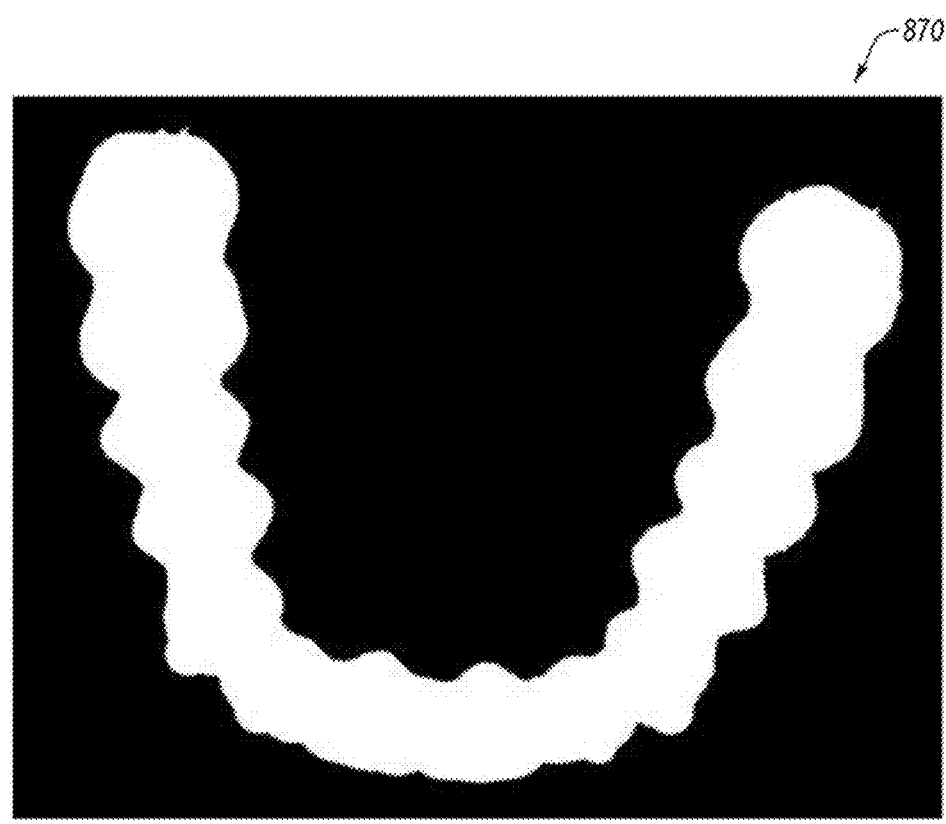
Figure 8I:
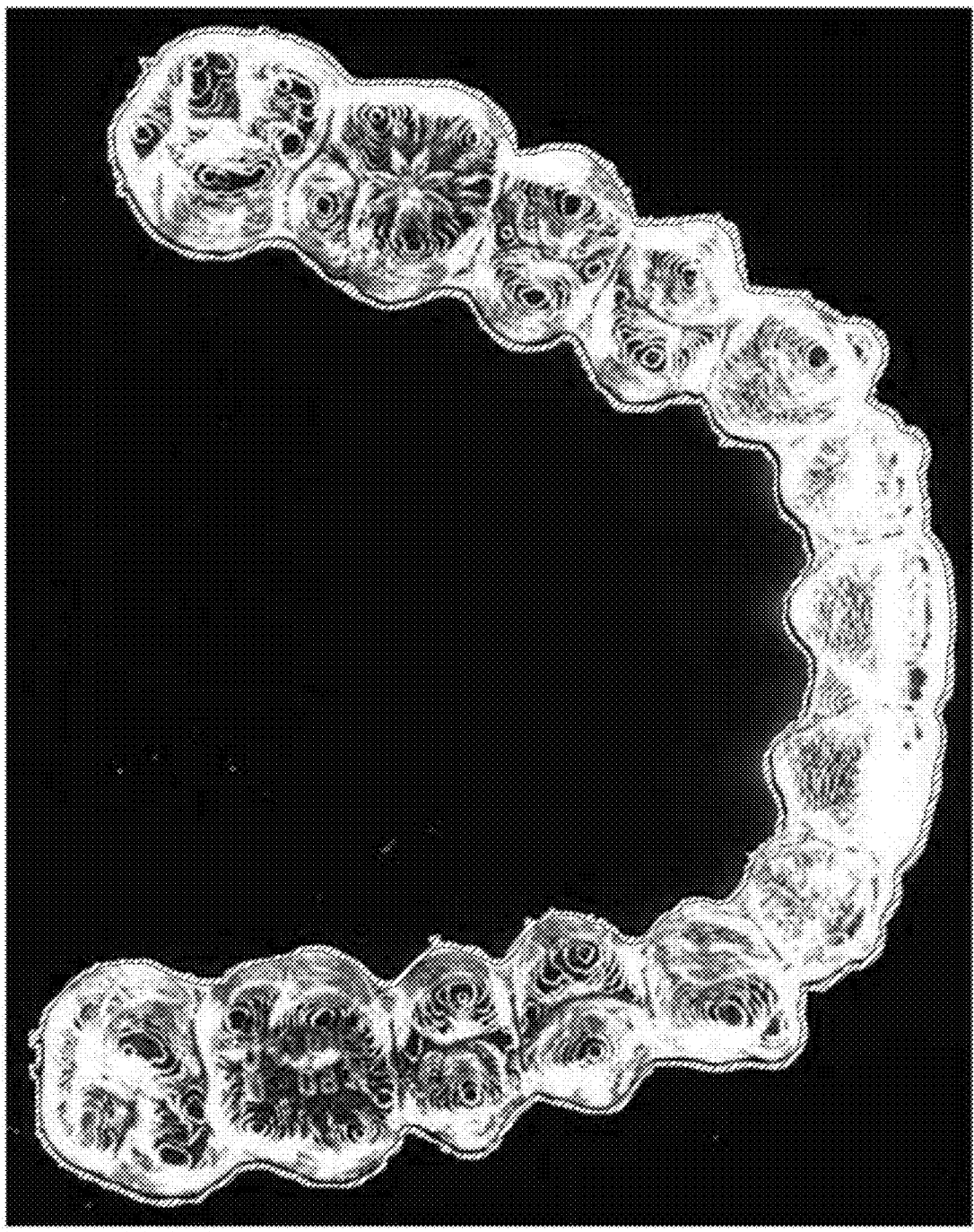

At block 735, processing logic extracts a portion of the first mask overlaid with the intensity mask that is common to both the first mask and the intensity mask after filling any holes (which are represented as region 864 in image 860). The common areas are used for a final mask. Pixels of the final mask are classified as an area that comprises a representation of the dental appliance. FIG. 8H illustrates the final mask 870. FIG. 8I illustrates an overlay of the original top view image 800 and the final mask 870, showing the high accuracy of the final mask 870. After the final mask is obtained, it can be used to define the area of the image to be compared to the digital model of the aligner to identify any variations between the contour of the area used and the contour of the digital model.

Figure 9:
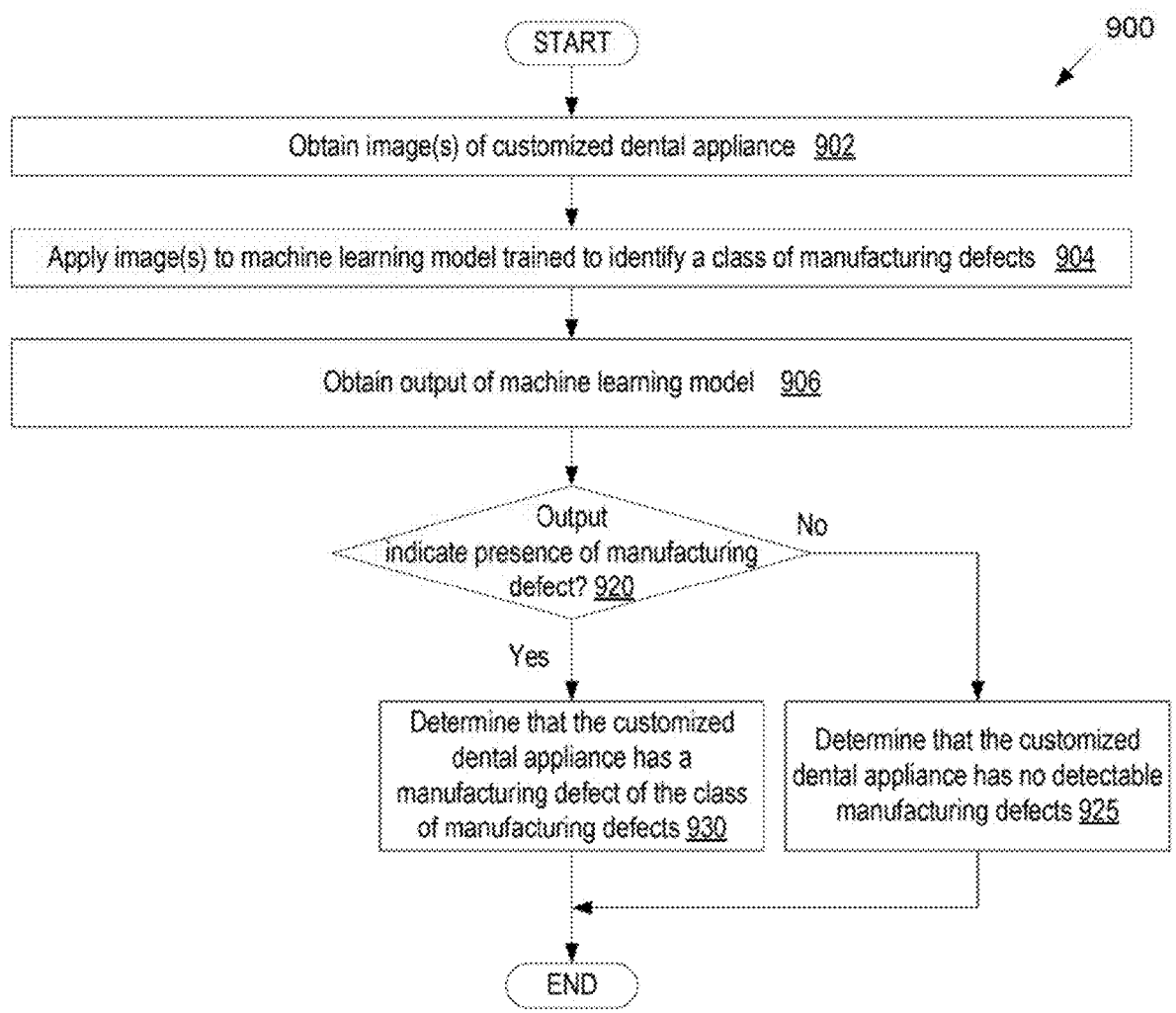
FIG. 9 illustrates a method of detecting defects in a dental appliance based on processing one or more images of the dental appliance using a machine learning model, in accordance with embodiments.

FIG. 9 illustrates a method 900 of detecting defects in a dental appliance based on processing one or more images of the dental appliance using a machine learning model, in accordance with embodiments. One or more operations of method 900 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 900 may be performed by a processing device executing a defect detector 1150 of FIG. 11.

At block 902 of method 900, processing logic obtains one or more images of a customized dental appliance. At block 904, processing logic applies the one or more images to a machine learning model that has been trained to identify a class of manufacturing defects. The machine learning model may have been trained using a training dataset that included labeled images with defects and labeled images without defects. A machine learning model may refer to a model artifact that is created by a training engine using training data (e.g., training input and corresponding target outputs). Training may be performed using a set of training data including labels indicating whether or not each of the first set of dental appliances experienced one or more defects. Actual defects for dental appliances may be reported by manufacturing technicians, by an automated manufacturing system and/or by patients. Such historical data on actual defects on dental appliances may then be added as labels or metadata to the associated images of the dental appliances showing the defects. Historical data of dental appliances without defects may also be provided. The machine learning model may be composed of a single level of linear or non-linear operations (e.g., a support vector machine (SVM) or a single level neural network) or may be a deep neural network that is composed of multiple levels of non-linear operations. Examples of deep networks and neural networks include convolutional neural networks and/or recurrent neural networks with one or more hidden layers. Some neural networks may be composed of interconnected nodes, where each node receives input from a previous node, performs one or more operations, and sends the resultant output to one or more other connected nodes for further processing.

The machine learning model may produce an output, which may be a vector or scalar indicating a probability that the image includes a defect and/or a confidence value associated with the determined probability. At block 906, processing logic obtains the output of the machine learning model. At block 920, processing logic determines whether the output indicates a presence of a manufacturing defect. A probability that is greater than a threshold probability may indicate the presence of a defect. In one embodiment, a probability of 70% indicates a defect. Alternatively, other threshold probabilities may include 65%, 75%, 80%, 90%, and so on. If a determination is made that the output indicates the presence of a manufacturing defect, the method continues to block 930, and processing logic determines that the customized dental appliance has a manufacturing defect of the class of manufacturing defects that the machine learning model was trained to detect. Otherwise the method continues to block 925, and processing logic determines that the customized dental appliance has no detectable manufacturing defects. In some embodiments, the machine learning model is trained to identify multiple different classes of manufacturing defects. In such an instance, the output may include a vector that includes probability values associated with each type of detectable manufacturing defect.

Figure 10:
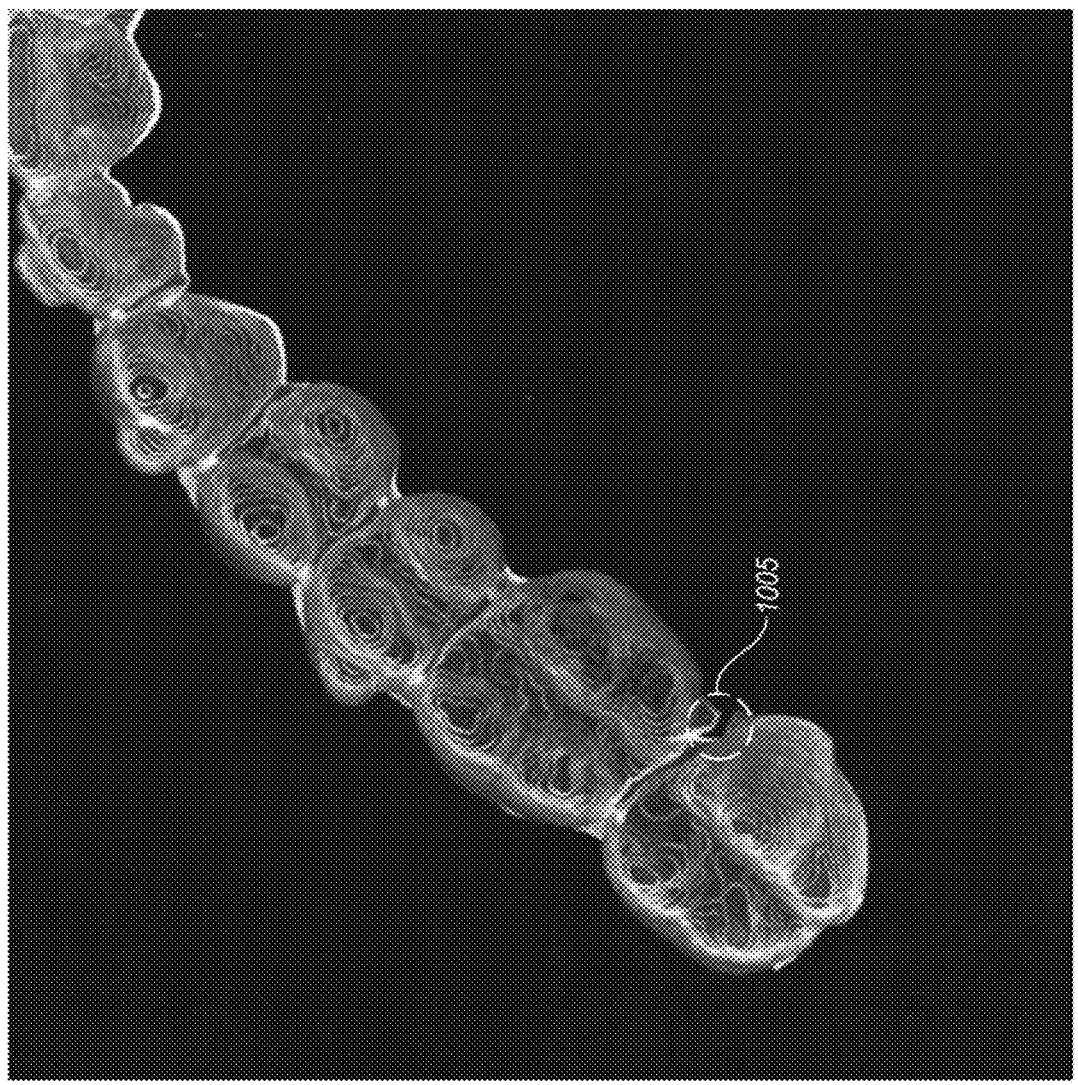
FIG. 10 illustrates an example image of a dental appliance with a defect, in accordance with one embodiment.

FIG. 10 illustrates an example image of a dental appliance (an orthodontic aligner) 1000 with a defect 1005, in accordance with one embodiment. The defect 1005 is a tear in the dental appliance.

Figure 11:
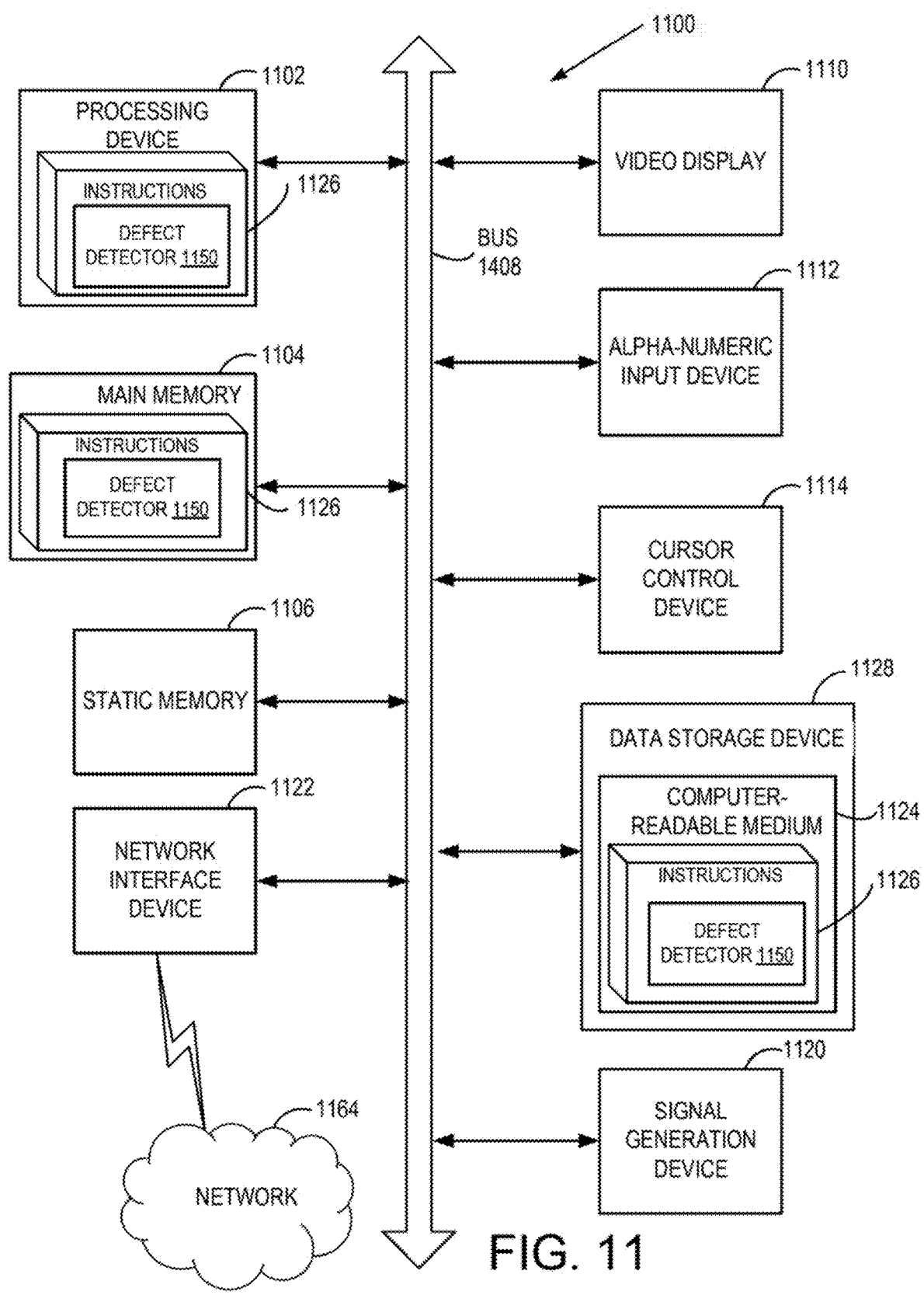
FIG. 11 illustrates a block diagram of an example computing device, in accordance with one embodiment.

FIG. 11 illustrates a diagrammatic representation of a machine in the example form of a computing device 1100 within which a set of instructions for causing the machine to perform any one or more of the methodologies discussed herein. In some embodiments, the machine may be part of an IBQC station or communicatively coupled to the IBQC station. In alternative embodiments, the machine may be connected (e.g., networked) to other machines in a Local Area Network (LAN), an intranet, an extranet, or the Internet. For example, the machine may be networked to the IBQC station and/or a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1100 includes a processing device 1102, a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1128), which communicate with each other via a bus 1108.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute the processing logic (instructions 1126) for performing operations and steps discussed herein.

The computing device 1100 may further include a network interface device 1122 for communicating with a network 1164. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1128 may include a machine-readable storage medium (or more specifically a non-transitory computer-readable storage medium) 1124 on which is stored one or more sets of instructions 1126 embodying any one or more of the methodologies or functions described herein. A non-transitory storage medium refers to a storage medium other than a carrier wave. The instructions 1126 may also reside, completely or at least partially, within the main memory 1104 and/or within the processing device 1102 during execution thereof by the computer device 1100, the main memory 1104 and the processing device 1102 also constituting computer-readable storage media.

The computer-readable storage medium 1124 may also be used to store one or more virtual 3D models (also referred to as digital models) and/or a defect detector 1150, which may perform one or more of the operations of the methods described herein. The computer readable storage medium 1124 may also store a software library containing methods that call a defect detector 1150. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method for detecting one or more defects in a customized dental appliance, the customized dental appliance customized for a specific arch of a specific patient, the method comprising:
    obtaining one or more images of the customized dental appliance;
    obtaining a digital model associated with the customized dental appliance;
    performing segmentation on the one or more images to identify an area of the one or more images that comprises a representation of the customized dental appliance;
    registering the one or more images to the digital model;
    comparing the area of the one or more images of the customized dental appliance with the digital model of the customized dental appliance;
    determining a difference between the area of the one or more images that comprises the representation of the customized dental appliance and the digital model of the customized dental appliance at a region;
    determining whether the difference satisfies a defect criterion; and
    responsive to determining that the difference satisfies the defect criterion, determining that the customized dental appliance has a manufacturing defect at the region associated with the difference.

2. The method of claim 1, wherein the one or more images comprises a top view image of the customized dental appliance, and wherein performing segmentation on the one or more images comprises:
    applying a filter to the top view image of the customized dental appliance to obtain a modified image of the customized dental appliance including an accentuated contour and suppressed reflections;
    generating a first mask of the customized dental appliance based on the modified image;
    refining the first mask by extracting a contour of the first mask;
    calculating a median value of pixels of the top view image that are located within the contour of the first mask;
    applying the median value as a threshold to the top view image to obtain an intensity mask;
    overlaying the first mask with the intensity mask; and
    extracting a portion of the first mask overlaid with the intensity mask that is common to both the first mask and the intensity mask as a final mask, wherein pixels within the final mask are classified as the area that comprises the representation of the customized dental appliance.

3. The method of claim 2, wherein generating the first mask of the customized dental appliance comprises
    applying a fixed threshold to the modified image to obtain a threshold image;
    selecting a largest component of the threshold image; and
    filling an interior of the largest component of the threshold image to obtain the first mask of the customized dental appliance.

4. The method of claim 1, further comprising:
    assigning a visual indicator to one or more points in the region associated with the difference that satisfies the defect criterion, wherein the visual indicator indicates that the one or more points comprise a manufacturing defect.

5. The method of claim 1, further comprising:
    determining one or more corrective actions, wherein the one or more corrective actions comprise updating at least one of a digital model associated with a mold used during manufacture of the customized dental appliance or the digital model associated with the customized dental appliance to remedy the one or more defects by at least one of adding virtual filler material, revising a cutline, or modifying one or more attachments of the mold.

6. The method of claim 1, wherein the defect criterion is associated with a first class of manufacturing defect, the method further comprising:
    applying the one or more images to a machine learning model trained to identify a second class of manufacturing defect, wherein the machine learning model was trained using a set of training data including a plurality of images of dental appliances including defects corresponding to the second class of manufacturing defect and annotations identifying the defects;
determining whether an output of the machine learning model indicates a presence of any manufacturing defects of the second class of manufacturing defect; and
responsive to determining that the output indicates the presence of a manufacturing defect of the second class of manufacturing defect, determining that the customized dental appliance has a manufacturing defect.

7. The method of claim 1, wherein the difference comprises a line in the one or more images that is not depicted in the digital model, wherein the line represents a crack in the customized dental appliance.

8. The method of claim 1, wherein the difference comprises a difference in curvature between a line in the one or more images and a corresponding line in the digital model.

9. The method of claim 1, wherein the customized dental appliance is an orthodontic aligner.

10. The method of claim 1, further comprising performing one or more corrective actions responsive to determining that the customized dental appliance has the manufacturing defect.

11. A method for predicting one or more manufacturing defects in a customized dental appliance, the customized dental appliance customized for a specific arch of a specific patient, the method comprising:
transforming a plurality of points in a digital model of a mold for the customized dental appliance into a voxel volume comprising a plurality of voxels;
performing a first smoothing operation on the voxel volume to generate a first smoothed surface comprising first curves having at least a first minimum radius;
performing a second smoothing operation on the voxel volume to generate a second smoothed surface comprising second curves having at least a second minimum radius;
determining distances between points on the first smoothed surface and corresponding points on the second smoothed surface;
determining whether any of the distances exceed a threshold; and
responsive to determining that at least one of the distances exceeds the threshold, determining that a point associated with the distance represents a region with a high probability of having a manufacturing defect.

12. The method of claim 11, further comprising:
generating a heat map based on the distances determined for each of the points, wherein the heat map provides an indicator for each point that indicates whether the point is at risk for a manufacturing defect.

13. The method of claim 11, wherein:
performing the first smoothing operation on the voxel volume comprises:
inflating the voxel volume by a first distance field offset to generate a first inflated voxel volume;
transforming a surface of the first inflated voxel volume into a first inflated polygonal mesh;
transforming the first inflated polygonal mesh into a first intermediate voxel volume; and
deflating the first intermediate voxel volume by the first distance field offset to generate a first smoothed voxel volume; and
performing the second smoothing operation on the voxel volume comprises:
inflating the voxel volume by a second distance field offset to generate a second inflated voxel volume;
transforming a surface of the second inflated voxel volume into a second inflated polygonal mesh;
transforming the second inflated polygonal mesh into a second intermediate voxel volume; and
deflating the second intermediate voxel volume by the second distance field offset to generate a second smoothed voxel volume.

14. The method of claim 13, wherein the first distance field offset is less than the second distance field offset.

15. The method of claim 11, wherein determining the distances between the points on the first smoothed surface and the corresponding points on the second smoothed surface comprises:
projecting each point of a plurality of points of the first smoothed surface onto the second smoothed surface; and
calculating the distance between each point of the plurality of points of the first smoothed surface that have been projected onto the second smoothed surface and a corresponding point of a plurality of points on the second smoothed surface.

16. The method of claim 11, wherein determining the distances between the points on the first smoothed surface and the corresponding points on the second smoothed surface comprises:
projecting each point of a plurality of points of the second smoothed surface onto the first smoothed surface; and
calculating a distance between each point of the plurality of points of the second smoothed surface that have been projected on to the first smoothed surface and a corresponding point of a plurality of points on the first smoothed surface.

17. The method of claim 11, wherein the customized dental appliance is an orthodontic aligner.

18. The method of claim 11, further comprising performing one or more corrective actions responsive to determining that the customized dental appliance has the manufacturing defect, wherein the one or more corrective actions comprise updating the digital model of the mold to limit the manufacturing defect by at least one of adding virtual filler material, revising a cutline, or modifying one or more attachments of the mold.

19. A system comprising:
a memory comprising instructions for detecting one or more defects in a customized dental appliance, the customized dental appliance customized for a specific arch of a specific patient; and
a processing device operably coupled to the memory, wherein execution of the instructions causes the processing device to:
obtain one or more images of the customized dental appliance;
obtain a digital model associated with the customized dental appliance;
perform segmentation on the one or more images to identify an area of the one or more images that comprises a representation of the customized dental appliance;
register the one or more images to the digital model;
compare the area of the one or more images of the customized dental appliance with the digital model of the customized dental appliance;
determine a difference between the area of the one or more images that comprises the representation of the customized dental appliance and the digital model of the customized dental appliance at a region;

determine whether the difference satisfies a defect criterion; and responsive to determining that the difference satisfies the defect criterion, determine that the customized dental appliance has a manufacturing defect at the region associated with the difference.

20. The system of claim 19, wherein the one or more images comprises a top view image of the customized dental appliance, and wherein to perform the segmentation on the one or more images the processing device is to:

apply a filter to the top view image of the customized dental appliance to obtain a modified image of the customized dental appliance including an accentuated contour and suppressed reflections;

generate a first mask of the customized dental appliance based on the modified image;

refine the first mask by extracting a contour of the first mask;

calculate a median value of pixels of the top view image that are located within the contour of the first mask;

apply the median value as a threshold to the top view image to obtain an intensity mask;

overlay the first mask with the intensity mask; and extract a portion of the first mask overlaid with the intensity mask that is common to both the first mask and the intensity mask as a final mask, wherein pixels within the final mask are classified as the area that comprises the representation of the customized dental appliance.

21. The system of claim 20, wherein to generate the first mask of the customized dental appliance the processing device is to:

apply a fixed threshold to the modified image to obtain a threshold image;

select a largest component of the threshold image; and fill an interior of the largest component of the threshold image to obtain the first mask of the customized dental appliance.

22. The system of claim 19, wherein execution of the instructions further causes the processing device to:

assign a visual indicator to one or more points in the region associated with the difference that satisfies the defect criterion, wherein the visual indicator indicates that the one or more points comprise a manufacturing defect.

23. The system of claim 19, wherein the defect criterion is associated with a first class of manufacturing defect, and wherein execution of the instructions further causes the processing device to:

apply the one or more images to a machine learning model trained to identify a second class of manufacturing defect, wherein the machine learning model was trained using a set of training data including a plurality of images of dental appliances including defects corresponding to the second class of manufacturing defect and annotations identifying the defects;

determine whether an output of the machine learning model indicates a presence of any manufacturing defects of the second class of manufacturing defect; and responsive to determining that the output indicates the presence of a manufacturing defect of the second class of manufacturing defect, determine that the customized dental appliance has a manufacturing defect.

24. The system of claim 19, wherein the difference comprises at least one of a) a line in the one or more images that is not depicted in the digital model, wherein the line represents a crack in the customized dental appliance or b) a difference in curvature between a line in the one or more images and a corresponding line in the digital model.

25. A system comprising:

a memory comprising instructions for detecting one or more defects in a customized dental appliance, the customized dental appliance customized for a specific arch of a specific patient; and a processing device operably coupled to the memory, wherein execution of the instructions causes the processing device to:

transform a plurality of points in a digital model of a mold for the customized dental appliance into a voxel volume comprising a plurality of voxels;

perform a first smoothing operation on the voxel volume to generate a first smoothed surface comprising first curves having at least a first minimum radius;

perform a second smoothing operation on the voxel volume to generate a second smoothed surface comprising second curves having at least a second minimum radius;

determine distances between points on the first smoothed surface and corresponding points on the second smoothed surface;

determine whether any of the distances exceed a threshold; and responsive to determining that at least one of the distances exceeds the threshold, determine that a point associated with the distance represents a region with a high probability of having a manufacturing defect.

26. The system of claim 25, wherein the instructions further cause the processing device to:

assign a heat map based on the distances determined for each of the points, wherein the heat map provides an indicator for each point that indicates whether the point is at risk for a manufacturing defect.

27. The system of claim 26, wherein:

performing the first smoothing operation on the voxel volume comprises:

inflating the voxel volume by a first distance field offset to generate a first inflated voxel volume;

transforming a surface of the first inflated voxel volume into a first inflated polygonal mesh;

transforming the first inflated polygonal mesh into a first intermediate voxel volume; and deflating the first intermediate voxel volume by the first distance field offset to generate a first smoothed voxel volume; and performing the second smoothing operation on the voxel volume comprises:

inflating the voxel volume by a second distance field offset to generate a second inflated voxel volume;

transforming a surface of the second inflated voxel volume into a second inflated polygonal mesh;

transforming the second inflated polygonal mesh into a second intermediate voxel volume; and deflating the second intermediate voxel volume by the second distance field offset to generate a second smoothed voxel volume.

28. The system of claim 27, wherein the first distance field offset is less than the second distance field offset.

29. The system of claim 25, wherein determining the distances between the points on the first smoothed surface and the corresponding points on the second smoothed surface comprises:
- projecting each point of a plurality of points of the first smoothed surface onto the second smoothed surface; and
- calculating a distance between each point of the plurality of points of the first smoothed surface that have been projected onto the second smoothed surface and a corresponding point of a plurality of points on the second smoothed surface.

30. The system of claim 25, wherein determining the distances between the points on the first smoothed surface and the corresponding points on the second smoothed surface comprises:
- projecting each point of a plurality of points of the second smoothed surface onto the first smoothed surface; and
- calculating the distance between each point of the plurality of points of the second smoothed surface that have been projected on to the first smoothed surface and a corresponding point of a plurality of points on the first smoothed surface.

* * * * *